(12) United States Patent
Moyers et al.

(10) Patent No.: US 9,077,549 B2
(45) Date of Patent: Jul. 7, 2015

(54) CREATING VIRTUAL AREAS FOR REALTIME COMMUNICATIONS

(75) Inventors: Josh Moyers, San Francisco, CA (US); Matthew Leacock, Sunnyvale, CA (US); Paul J. Brody, Palo Alto, CA (US); David Van Wie, Eugene, OR (US); Seth Miller, Eugene, OR (US)

(73) Assignee: Social Communications Company, Eugene, OR (US)

( * ) Notice: Subject to any disclaimer, the term of this patent is extended or adjusted under 35 U.S.C. 154(b) by 204 days.

(21) Appl. No.: 13/432,784

(22) Filed: Mar. 28, 2012

(65) Prior Publication Data

US 2012/0254858 A1    Oct. 4, 2012

Related U.S. Application Data

(60) Provisional application No. 61/470,938, filed on Apr. 1, 2011.

(51) Int. Cl.
| | |
|---|---|
| G06F 9/44 | (2006.01) |
| H04L 12/18 | (2006.01) |
| H04L 12/58 | (2006.01) |
| G06F 9/445 | (2006.01) |

(52) U.S. Cl.
CPC ............. *H04L 12/1818* (2013.01); *G06F 8/61* (2013.01); *H04L 51/04* (2013.01)

(58) Field of Classification Search
CPC ....................................................... G06F 8/61
USPC ......................................................... 717/177
See application file for complete search history.

(56) References Cited

U.S. PATENT DOCUMENTS

| 5,471,318 A | 11/1995 | Ahuja |
| 5,627,978 A | 5/1997 | Altom |
| 5,764,916 A | 6/1998 | Busey |
| 5,793,365 A | 8/1998 | Tang |
| 5,982,372 A | 11/1999 | Brush, II |

(Continued)

FOREIGN PATENT DOCUMENTS

| EP | 1964597 | 9/2008 |
| EP | 2237537 | 10/2010 |

(Continued)

OTHER PUBLICATIONS

International Preliminary Report on Patentability issued in counterpart International Application No. PCT/US2012/030766 (mailed Oct. 1, 2013).

*Primary Examiner* — Don Wong
*Assistant Examiner* — Theodore Hebert
(74) *Attorney, Agent, or Firm* — Edouard Garcia

(57) ABSTRACT

Examples that are described herein provide systems and methods for creating virtual areas for realtime communications. Some examples provide a quick and easy process for creating a virtual area for a set of communicants and provisioning those communicants for realtime communications in the virtual area. Some examples provide a quick and easy way for a user to wrap a realtime communications framework around a network service. Through seamless integration of realtime communications (e.g., realtime audio, video, chat, screen sharing, and file transfer) in persistent virtual areas, these examples are able to enhance and improve communicants' experiences with a network service relative to traditional browser based methods of collaborating on network service based projects.

19 Claims, 10 Drawing Sheets

(56) References Cited

U.S. PATENT DOCUMENTS

| | | |
|---|---|---|
| 5,999,208 A | 12/1999 | McNerney |
| 6,057,656 A | 5/2000 | Miyashita |
| 6,119,147 A | 9/2000 | Toomey |
| 6,119,166 A | 9/2000 | Bergman |
| 6,219,045 B1 | 4/2001 | Leahy |
| 6,237,025 B1 | 5/2001 | Ludwig |
| 6,275,490 B1 | 8/2001 | Mattaway |
| 6,380,952 B1 | 4/2002 | Mass |
| 6,392,760 B1 | 5/2002 | Ahuja |
| 6,396,509 B1 | 5/2002 | Cheng |
| 6,572,476 B2 | 6/2003 | Shoji |
| 6,580,441 B2 | 6/2003 | Schileru-Key |
| 6,708,172 B1 | 3/2004 | Wong |
| 6,714,222 B1 | 3/2004 | Bjorn |
| 6,731,314 B1 | 5/2004 | Cheng |
| 6,772,195 B1 | 8/2004 | Hatlelid |
| 6,785,708 B1 | 8/2004 | Busey |
| 6,862,625 B1 | 3/2005 | Busey |
| 7,016,978 B2 | 3/2006 | Malik |
| 7,036,082 B1 | 4/2006 | Dalrymple |
| 7,058,896 B2 | 6/2006 | Hughes |
| 7,165,213 B1 | 1/2007 | Busey |
| 7,181,690 B1 | 2/2007 | Leahy |
| 7,184,037 B2 | 2/2007 | Gallery |
| 7,263,526 B1 | 8/2007 | Busey |
| 7,336,779 B2 | 2/2008 | Boyer |
| 7,392,306 B1 | 6/2008 | Donner |
| 7,474,741 B2 | 1/2009 | Brunson |
| 7,478,086 B2 | 1/2009 | Samn |
| 7,516,411 B2 | 4/2009 | Grossner |
| 7,616,624 B2 | 11/2009 | John |
| 7,676,542 B2 | 3/2010 | Moser |
| 7,680,098 B2 | 3/2010 | John |
| 7,680,480 B2 | 3/2010 | John |
| 7,707,249 B2 | 4/2010 | Spataro |
| 7,734,691 B2 | 6/2010 | Creamer |
| 7,747,719 B1 | 6/2010 | Horvitz |
| 7,765,259 B2 | 7/2010 | MacVarish |
| 7,769,806 B2 | 8/2010 | Van Wie |
| 7,813,488 B2 | 10/2010 | Kozdon |
| 7,827,288 B2 | 11/2010 | Da Palma |
| 7,840,668 B1 | 11/2010 | Sylvain |
| 7,844,724 B2 | 11/2010 | Van Wie |
| 8,028,021 B2 * | 9/2011 | Reisinger ............ 709/204 |
| 8,231,465 B2 * | 7/2012 | Yee et al. ............ 463/32 |
| 2002/0049814 A1 | 4/2002 | Yoo |
| 2002/0080195 A1 | 6/2002 | Carlson |
| 2002/0097267 A1 | 7/2002 | Dinan |
| 2003/0043200 A1 | 3/2003 | Faieta |
| 2003/0046374 A1 | 3/2003 | Hilt |
| 2003/0191799 A1 | 10/2003 | Araujo |
| 2003/0222902 A1 | 12/2003 | Chupin |
| 2004/0030783 A1 | 2/2004 | Hwang |
| 2004/0158610 A1 | 8/2004 | Davis |
| 2005/0080866 A1 | 4/2005 | Kent |
| 2005/0108033 A1 | 5/2005 | Everett-Church |
| 2005/0138570 A1 | 6/2005 | Good |
| 2005/0163311 A1 | 7/2005 | Fowler |
| 2006/0117264 A1 | 6/2006 | Beaton |
| 2006/0167972 A1 | 7/2006 | Zombek |
| 2006/0184886 A1 | 8/2006 | Chung |
| 2006/0248159 A1 | 11/2006 | Polan |
| 2007/0047700 A1 | 3/2007 | Mohler |
| 2007/0220111 A1 | 9/2007 | Lin |
| 2007/0233785 A1 | 10/2007 | Abraham |
| 2007/0274291 A1 | 11/2007 | Diomelli |
| 2007/0279484 A1 | 12/2007 | Derocher |
| 2007/0291034 A1 | 12/2007 | Dones |
| 2008/0019285 A1 | 1/2008 | John |
| 2008/0021949 A1 | 1/2008 | John |
| 2008/0052373 A1 | 2/2008 | Pousti |
| 2008/0059570 A1 | 3/2008 | Bill |
| 2008/0163090 A1 | 7/2008 | Cortright |
| 2008/0168154 A1 | 7/2008 | Skyrm et al. |
| 2008/0215679 A1 * | 9/2008 | Gillo et al. ............ 709/204 |
| 2009/0106376 A1 | 4/2009 | Tom |
| 2009/0113053 A1 * | 4/2009 | Van Wie et al. ............ 709/226 |
| 2009/0113066 A1 * | 4/2009 | Van Wie et al. ............ 709/231 |
| 2009/0132943 A1 * | 5/2009 | Minsky et al. ............ 715/767 |
| 2009/0199095 A1 | 8/2009 | Nicol, II et al. |
| 2009/0254842 A1 | 10/2009 | Leacock |
| 2009/0254843 A1 * | 10/2009 | Van Wie et al. ............ 715/757 |
| 2009/0288007 A1 | 11/2009 | Leacock |
| 2009/0307189 A1 | 12/2009 | Bobbitt |
| 2010/0138492 A1 | 6/2010 | Guzman |
| 2010/0146118 A1 | 6/2010 | Wie |
| 2010/0162121 A1 | 6/2010 | Yoakum |
| 2010/0164956 A1 | 7/2010 | Hyndman |
| 2010/0169796 A1 | 7/2010 | Lynk |
| 2010/0169799 A1 | 7/2010 | Hyndman |
| 2010/0169888 A1 | 7/2010 | Hare |
| 2010/0185733 A1 | 7/2010 | Hon |
| 2010/0228560 A1 | 9/2010 | Balasaygun |
| 2010/0235501 A1 | 9/2010 | Klemm |
| 2010/0241432 A1 | 9/2010 | Michaelis |
| 2010/0246570 A1 | 9/2010 | Chavez |
| 2010/0246571 A1 | 9/2010 | Geppert |
| 2010/0246800 A1 | 9/2010 | Geppert |
| 2010/0251119 A1 | 9/2010 | Geppert |
| 2010/0251124 A1 | 9/2010 | Geppert |
| 2010/0251127 A1 | 9/2010 | Geppert |
| 2010/0251142 A1 | 9/2010 | Geppert |
| 2010/0251158 A1 | 9/2010 | Geppert |
| 2010/0251177 A1 | 9/2010 | Geppert |
| 2010/0262550 A1 | 10/2010 | Burritt |
| 2010/0322395 A1 | 12/2010 | Michaelis |
| 2012/0254858 A1 * | 10/2012 | Moyers et al. ............ 717/177 |

FOREIGN PATENT DOCUMENTS

| | | | |
|---|---|---|---|
| EP | 2239930 | 10/2010 | |
| KR | 10-2006-006078 A | 6/2006 | |
| WO | WO0070557 | 11/2000 | |
| WO | WO0191868 | 12/2001 | |
| WO | WO 2009-000028 A1 | 12/2008 | |
| WO | WO 2009000028 A1 * | 12/2008 | ............ G06F 3/048 |

\* cited by examiner

CREATING VIRTUAL AREAS FOR REALTIME COMMUNICATIONS

CROSS-REFERENCE TO RELATED APPLICATIONS

Under 35 U.S.C. §119(e), this application claims the benefit of U.S. Provisional Application No. 61/470,938, filed Apr. 1, 2011, the entirety of which is incorporated herein by reference.

This application relates to the following co-pending patent applications, the entirety of each of which is incorporated herein by reference: U.S. patent application Ser. No. 12/630,973, filed Dec. 4, 2009; U.S. patent application Ser. No. 12/418,243, filed Apr. 3, 2009; U.S. patent application Ser. No. 12/631,008, filed Dec. 4, 2009; U.S. patent application Ser. No. 12/631,026, filed Dec. 4, 2009; U.S. patent application Ser. No. 12/418,270, filed Apr. 3, 2009; U.S. patent application Ser. No. 12/825,512, filed Jun. 29, 2010; U.S. patent application Ser. No. 12/354,709, filed Jan. 15, 2009; U.S. patent application Ser. No. 12/509,658, filed Jul. 27, 2010; U.S. patent application Ser. No. 12/694,126, filed Jan. 26, 2010; U.S. patent application Ser. No. 13/209,812, filed Aug. 15, 2011; U.S. patent application Ser. No. 13/229,349, filed Sep. 9, 2011; U.S. patent application Ser. No. 13/399,775, filed Feb. 17, 2012; U.S. patent application Ser. No. 13/399,737, filed Feb. 17, 2012; U.S. Provisional Patent Application No. 61/563,088, filed Nov. 23, 2011; and U.S. Provisional Patent Application No. 61/603,024, filed Feb. 24, 2012.

BACKGROUND

When face-to-face communications are not practical, people often rely on one or more technological solutions to meet their communications needs. Traditional telephony systems enable voice communications between callers. Instant messaging (also referred to as "chat") communications systems enable users to communicate text messages in real time through instant message computer clients that are interconnected by an instant message server. Some instant messaging systems and interactive virtual reality communications systems allow users to be represented by user-controllable graphical objects (referred to as "avatars"). What are needed are improved systems and methods for realtime network communications.

DETAILED DESCRIPTION

Figure 1:
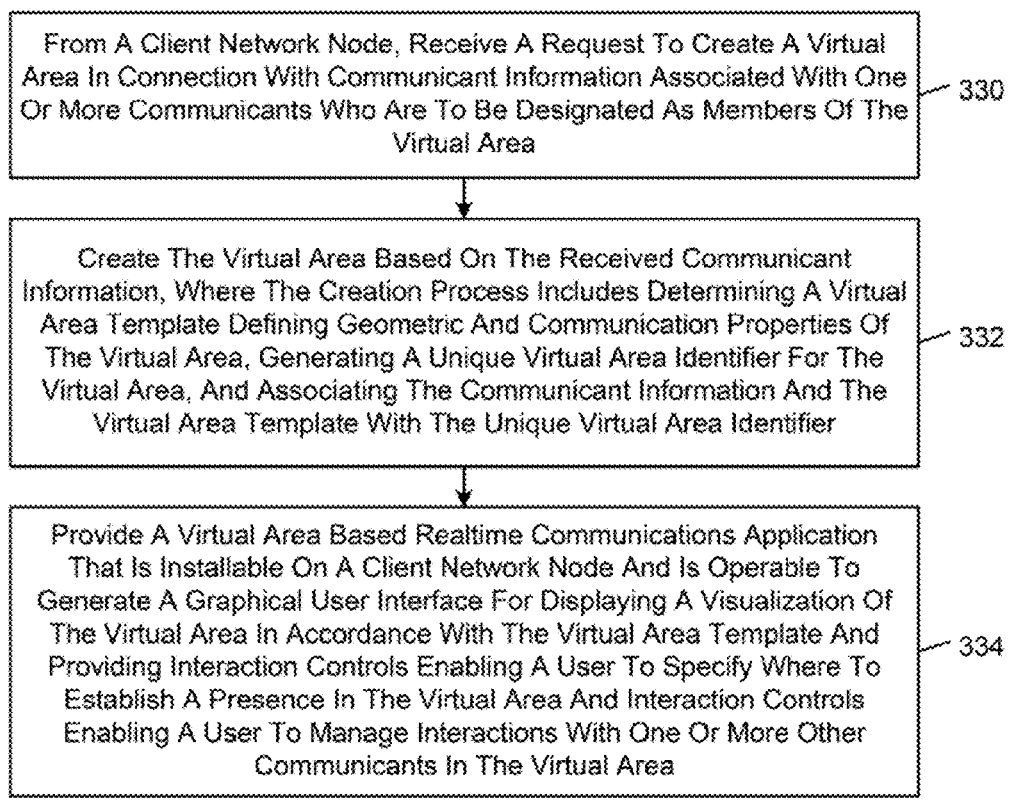
FIG. 1 is a flow diagram of an example of a method of creating a virtual area for realtime communications.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "window" is a visual area of a display that typically includes a user interface. A window typically displays the output of a software process and typically enables a user to input commands or data for the software process. A window that has a parent is called a "child window." A window that has no parent, or whose parent is the desktop window, is called a "top-level window." A "desktop" is a system-defined window that paints the background of a graphical user interface (GUI) and serves as the base for all windows displayed by all software processes.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Examples of network nodes include, but are not limited to, a terminal, a computer, and a network switch. A "server" network node is a host computer on a network that responds to requests for information or service. A "client network node" is a computer on a network that requests information or service from a server.

A Uniform Resource Identifier (URI) is a string of characters that identifies a network resource.

A "network resource" is anything that can be identified by a uniform resource identifier (URI) and accessed over a network, including an electronic document, an image, a source of information, a service, operators and operands of a mathematical equation, classes, properties, numeric values, and a collection of other resources.

A "network connection" is a link between two communicating network nodes. A "connection handle" is a pointer or identifier (e.g., a uniform resource identifier (URI)) that can be used to establish a network connection with a network resource. A "network communication" can include any type of information (e.g., text, voice, audio, video, electronic mail message, data file, motion data stream, and data packet) that is transmitted or otherwise conveyed from one network node to another network node over a network connection.

A "communicant interaction" is any type of direct or indirect action or influence between a communicant and another network entity, which may include for example another communicant, a virtual area, or a network service. Examples of types of communicant communications include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), screen shares, and file transfers.

A "virtual area" (also referred to as an "area" or a "place") is a representation of a computer-managed space or scene. Virtual areas typically are one-dimensional, two-dimensional, or three-dimensional representations; although in some examples a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization. A virtual area typically refers to an instance of a virtual area schema, where the schema defines the structure and contents of a virtual area in terms of variables and the instance defines the structure and contents of a virtual area in terms of values that have been resolved from a particular context.

A "virtual area application" (also referred to as a virtual area specification or template) is a description of a virtual area that is used in creating a virtual environment. A virtual area application typically includes definitions of geometry, physics, and realtime switching rules that are associated with one or more zones of the virtual area.

A "virtual area based realtime communications application" is a client communications application that integrates realtime audio communications (and potentially other realtime communications, e.g., video, chat, and realtime other data stream) with visual presentations of interactions in a virtual area.

A "virtual environment" is a representation of a computer-managed space that includes at least one virtual area and supports realtime communications between communicants.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

As used herein, the term "includes" means includes but not limited to, the term "including" means including but not limited to. The term "based on" means based at least in part on.

II. CREATING A VIRTUAL AREA FOR REALTIME COMMUNICATIONS

The examples that are described herein provide systems and methods for creating virtual areas for realtime communications.

Some examples provide a quick and easy process for creating a virtual area for a set of communicants and provisioning those communicants for realtime communications in the virtual area.

FIG. 1 shows an example of a method by which a virtual area is created by a virtual area creation service provided by a computer system (e.g., the virtual area platform described below). In accordance with this method, the computer system receives from a client network node a request to create a virtual area in connection with communicant information associated with one or more communicants who are to be designated as members of the virtual area (FIG. 1, block 330). The computer system creates the virtual area based on the received communicant information (FIG. 1, block 332). In this process, the computer system determines a virtual area template that defines geometric and communication properties of the virtual area, generates a unique virtual area identifier for the virtual area, and associates the communicant information and the virtual area template with the unique virtual area identifier. The computer system provides a virtual area based realtime communications application that is installable on a client network node and is operable to generate a graphical user interface for displaying a visualization of the virtual area in accordance with the virtual area template and providing interaction controls enabling a user to specify where to establish a presence in the virtual area and interaction controls enabling a user to manage interactions with one or more other communicants in the virtual area (FIG. 1, block 334).

In some examples, the communicant information includes a respective communication service handle (e.g., an email address or other communication service username or other identifier) for each of one or more of the communicants who are to be designated as members of the virtual area.

In some examples, the computer system additionally provides an interface to the client network node for specifying the communicant information. The computer system typically connects to a directory service (e.g., an Active Directory service available from Microsoft Corporation of Redmond, Wash. USA) that provides access to communicant information stored in a remote network directory. In some examples, the computer system connects to the directory service using the Lightweight Directory Access Protocol (LDAP). Based on user input received from the client network node, the computer system queries the directory service for communicant information in the remote network directory, and transmits results of the querying to the client network node for presentation in the interface. Based on user input in connection with the transmitted results of the querying, the computer retrieves from the remote network directory the communicant information associated with the one or more communicants who are to be designated as members of the virtual area.

In some examples, the computer system additionally generates a virtual area reference (e.g., a URI) to the virtual area, and transmits the virtual area reference to a particular client network node. Based on receipt of a request to follow the reference from the particular client network node, the computer system transmits instructions for rendering an instance of the virtual area in accordance with the virtual area template to an instance of the virtual area based realtime communications application operating on the particular network node. In some examples, the computer system transmits the virtual area reference to the particular client network node in association with an invitation to enter the virtual area.

Figure 2A:
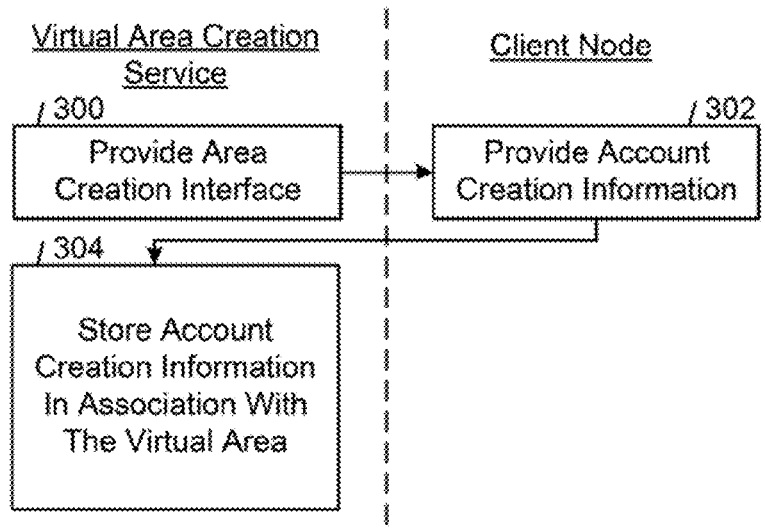
FIG. 2A is a flow diagram of an example of interactions between a virtual area creation service and a client network node.

FIG. 2A is a flow diagram of an example of interactions between a virtual area creation service and a client network node in a process of creating a virtual area.

In accordance with the flow diagram of FIG. 2A, the virtual area creation service provides an area creation interface to the client network node (FIG. 2A, block 300). In some examples, the area creation interface is a web page that provides a web form for entering account creation information and a user-activatable interface control (e.g., a button) that can be activated by the user to send the account creation information to the virtual area creation service and initiate a virtual area creation process.

Using the area creation interface, the user of the client network node provides account creation information and initiates a virtual area creation process (FIG. 2A, block 302). In some examples, a web browser component of the client network node renders the area creation interface on a display, receives input from the user, and transmits the user input (including account creation information) to the virtual area creation service.

The account creation information includes communicant information, which typically includes a list of the communicants who are to be designated as members of the virtual area, and profile information (e.g., contact information, such as a communication service handle and a username) for each of the members. The communicant information also may designate respective ones of the communicants as owners or co-owners of particular zones (e.g., offices or other types of rooms) in the virtual area. In some examples, the user has credentials that allow the virtual area creation service to access the communicant information from a network database that is managed by a directory service (e.g., a Windows® Active Directory service). The directory service exposes an API that allows the virtual area creation service to query the database for communicant information based on used-specified input. The virtual area creation service presents the query results to the user in the area creation interface. The user may use the area creation interface to designate which of the communicants listed in the query results are members of the virtual area. The virtual area creation service retrieves the communicant information for the designated members from the network database and stores the retrieved information in a database in association with the virtual area. In some cases, the user also is able to upload the communicant information to the virtual area creation service in the form of a data file (e.g., a comma separated value file).

In some examples, the account creation information also includes virtual area information (e.g., a virtual area type, name, and size). In other examples, the virtual area creation service automatically selects a default virtual area type and a size that accommodates the number of communicants who are designated as members of the virtual area.

The account creation information also may include network service information. The network service information typically includes a respective reference (e.g., a URI) for one or more network services (e.g., a respective URL for a respective homepage of each network service or a URL for a web page tied to a particular network service project associated with the user) that are to be associated with respective objects (e.g., viewscreen objects) in the virtual area.

The virtual area creation service creates a virtual area and stores the account creation information in association with the virtual area (FIG. 2A, block 304). In this process, the virtual area creation service typically generates a unique virtual area identifier for the virtual area and a unique virtual area customization identifier for the account information, and associates the account information, virtual area identifier, and the virtual area customization identifier in a database. In some examples, the virtual area creation service also creates an account and a respective account identifier for an organization designated by the user (e.g., a business, social group, or other organization of which designated communicants are members), and a separate account and a respective communicant identifier for each of the members of the virtual area listed in the communicant information. The virtual area creation service typically associates the communicant identifiers with the virtual area identifier (e.g., stores the identifiers of the designated communicants in a member list for the virtual area), and typically associates any designated network services with the virtual area (e.g., by associating respective URIs for the network services with respective objects in the virtual area). In some examples, the virtual area creation service associates the virtual area identifier and the virtual area customization identifier with an installation package for a virtual area based realtime communications application (e.g., by incorporating the virtual area identifier and the virtual area customization identifier into a link that is embedded in the installation package).

In some examples, the virtual area creation service also allows the user to send invitations to enter the virtual area to selected ones of the communicants. In his process, the virtual area creation service typically displays contact information for the communicants who are associated with the virtual area in an invitation dialog box associated with the area creation interface. The invitation dialog box typically includes virtual area member fields (e.g., a member name field and a field for a member's communication service handle, such as an electronic mail address) that are pre-populated with the members' contact information. The invitation dialog box includes a user control (e.g., a "submit" button) that allows the user to instruct the virtual area creation service to submit invitations to the members identified in the invitation dialog box. Each invitation typically includes a link that includes the virtual area identifier and allows each invitee to install the virtual area based realtime communications application on the invitee's client node and to cause the installed client application to navigate to an active instance of the virtual area or, if the client application already is installed, to cause the client application to navigate to the active instance of the virtual area. In some examples, the link in the invitation directs a browser component of an invitee's client network node to a landing web page provided by the virtual area creation service for downloading the client application installation package to the invitee's client network node. In some examples, the invitation links are virtual area location URLs of the type described in U.S. patent application Ser. No. 12/694,126, filed Jan. 26, 2010.

Figure 2B:
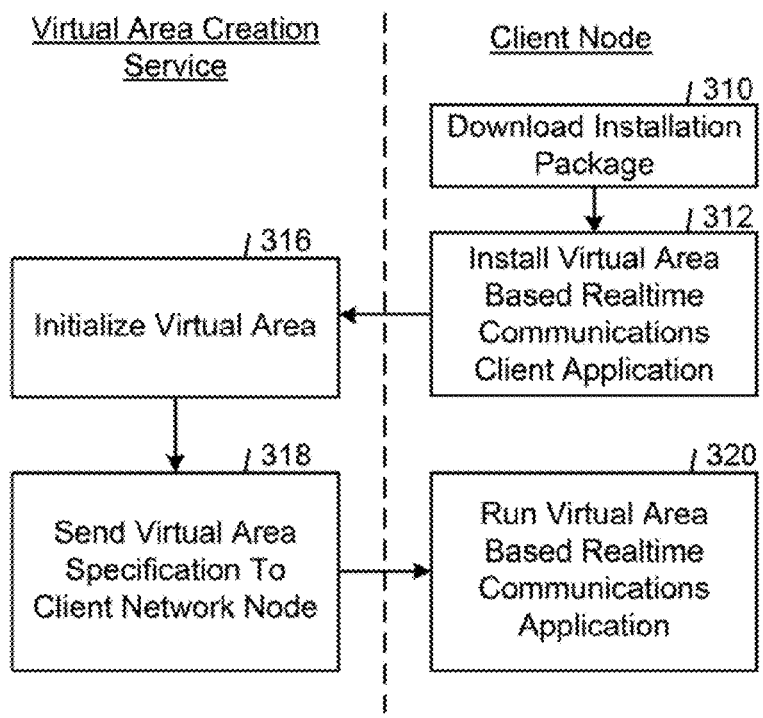
FIG. 2B is a flow diagram of an example of interactions between a virtual area creation service and a client network node.

FIG. 2B is a flow diagram of an example of interactions between the virtual area creation service and a user operating a client network node. The user may be, for example, the same user who created the virtual area in accordance with the process shown in FIG. 2A or one of the members of that virtual area.

The user downloads the client application installation package to the client network node (FIG. 2B, block 310). A browser component of the client network node typically navigates to the landing page (e.g., based on a link received in an invitation to join the virtual area) and downloads the installation package that is associated with the link provided by the virtual area creation service.

The user's client network node runs the installation package to install the virtual area based realtime communications application (FIG. 2B, block 316). In this process, an installer component of the installation package installs the virtual area based realtime communications application, extracts the virtual area identifier and the virtual area customization identifier from the installation package, and sends the virtual area identifier and the virtual area customization identifier to the virtual area creation service.

The virtual area creation service initializes the virtual area associated with the virtual area customization identifier (FIG. 2B, block 316). In some examples, the virtual area creation service selects the designated template for the virtual area, and establishes a presence for the user in a particular position in the virtual area.

The virtual area creation service sends a specification of the virtual area to the user's client network node (FIG. 2A, block 318). The virtual area creation service also typically sends the user's presence position and any network service association information to the user's client network node. In some examples, the virtual area creation service also sends contact information for other communicants that are identified in the account creation information as being associated with the virtual area.

The user's client network node runs the virtual area based realtime communications application, which enables realtime communications and shared interactions with other communicants in the virtual area (FIG. 2B, block 320).

Some of the examples described herein provide a quick and easy way for a user to wrap a realtime communications framework around a network service. Through seamless integration of realtime communications (e.g., realtime audio, video, chat, screen sharing, and file transfer) in persistent virtual areas, these examples are able to enhance and improve communicants' experiences with a network service relative to traditional browser based methods of collaborating on network service based projects. For example, instead of telephone based collaboration on a shared web browser view of a network service tool, examples described herein enable distributed communicants to use multimodal communications to collaborate in a persistent shared context defined by a virtual area that integrates a shared view of a network service based project with a persistent record of interactions that occur in the virtual area.

Figures 3A, 3B:
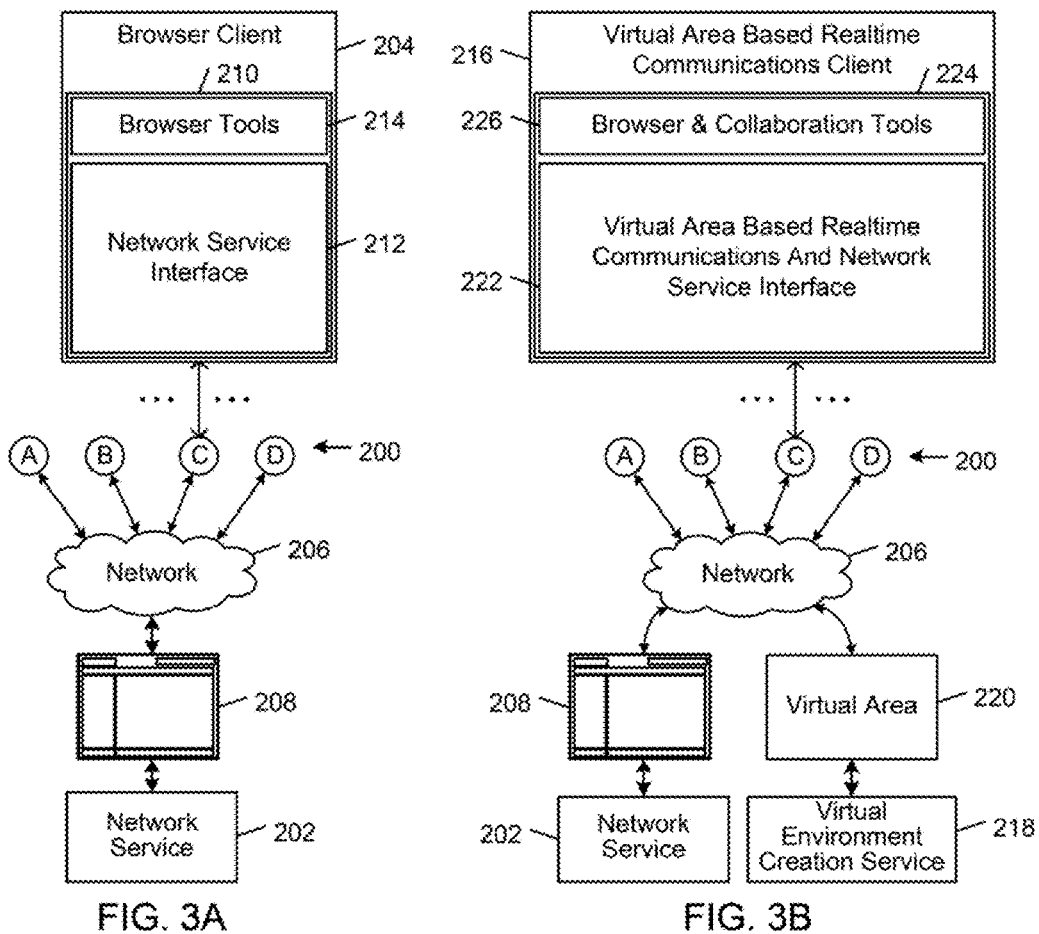
FIG. 3A is a diagrammatic view of an example of client network nodes interfacing with a network service through web browser client applications.
FIG. 3B is a diagrammatic view of an example of client network nodes interfacing with a network service and a virtual environment creation service through virtual area based realtime communications client applications.

FIG. 3A shows an example of client network nodes 200 (A, B, C, and D) respectively interfacing with a network service 202 through respective browser client applications 204 (only one browser client application is shown in FIG. 3A, the others being implied) over a network 206. The network service 202 typically is a service that provides a network resource that can be shared by client network nodes. Examples of the network service 202 include application services that deliver software applications and other network-based tools as a service over the network 206. In the illustrated example, the network service 202 is a web service that delivers an application interface to the client network nodes 200 in the form of one or more web page documents 208. The browser client applications 204 running on the client network nodes 200 render the web page documents 208 in a display area 212 of a browser interface 210, which includes browser tools 214 for interacting with the network service 202. In the example shown in FIG. 3A, any realtime communications between the communicants operating the client network nodes 200 are performed without the benefits of a seamless integration with the shared view of the network service application interface and a persistent shared context.

FIG. 3B shows an example of the client network nodes 200 respectively interfacing with the network service 202 and a virtual environment creation service 218 through respective virtual area based realtime communications client applications 216 (only one virtual area based realtime communications client application is shown in FIG. 1B, the others being implied) over the network 206. The virtual area creation service 218 typically is a service that supports realtime communications in a persistent virtual area 220. In the illustrated example, the network service 202 delivers an application interface to the client network nodes 200 in the form of one or more web page documents 208, and each of the virtual area based realtime communications clients running on the client network nodes 200 renders the web page documents 208 in a display area 222 of a virtual area based realtime communications and network service interface 224 that includes browser and collaboration tools 226 for interacting with the network service 202 and the virtual environment creation service 218. In the example shown in FIG. 1B, the communicants operating the client network nodes 200 have seamless access to multimodal communications in a persistent shared context defined by a virtual area that integrates a shared view of a network service based project with a persistent record of interactions that occur in the virtual area.

Figure 4:
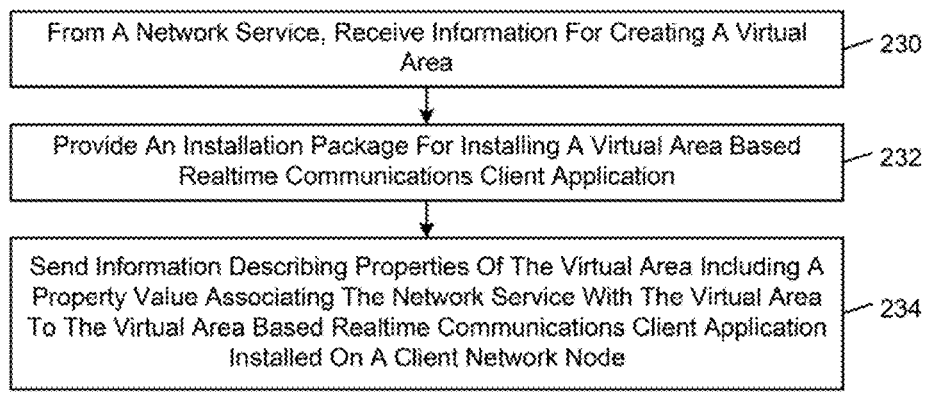
FIG. 4 is a flow diagram of an example of a method of associating a network service with virtual area based realtime communications.

FIG. 4 shows an example of a method of associating a network service with virtual area based realtime communications that enables communicants to migrate from the non-realtime network service interaction model shown in FIG. 3A to the realtime virtual area based network service interaction model shown in FIG. 3B. In some examples, elements of the method of FIG. 4 are integrated with or otherwise combined with elements of the virtual area creations methods described above.

In accordance with the method of FIG. 4, the virtual environment creation service 218 receives from a network service information for creating a virtual area (FIG. 4, block 230). The virtual area creation process typically is initiated by a user of the network service (e.g., an individual user, or an administrator or a project manager who manages a team of communicants who collaborate on a project through a tool provided by the network service) through an integration interface provided by the network service. The received information typically includes information about the network service, information about the user, and optionally information about one or more other communicants who share the network service with the user.

The virtual environment creation service 218 provides an installation package for installing a virtual area based realtime communications client application (FIG. 4, block 232). In some examples, the virtual environment creation service 218 maintains an association between the information received from the network service and the installation package so that the information can be used to customize the virtual area based realtime communications client application that is installed on a client network node.

The virtual environment creation service 218 sends information that describes properties of the virtual area including a property value associating the network service with the virtual area to the virtual area based realtime communications client application that is installed on a client network node (FIG. 4, block 234). The information that is sent to the virtual area based realtime communications client application typically incorporates the network service into the virtual area to provide a seamless integration of realtime communications and shared interactions with the network service.

Figure 5:
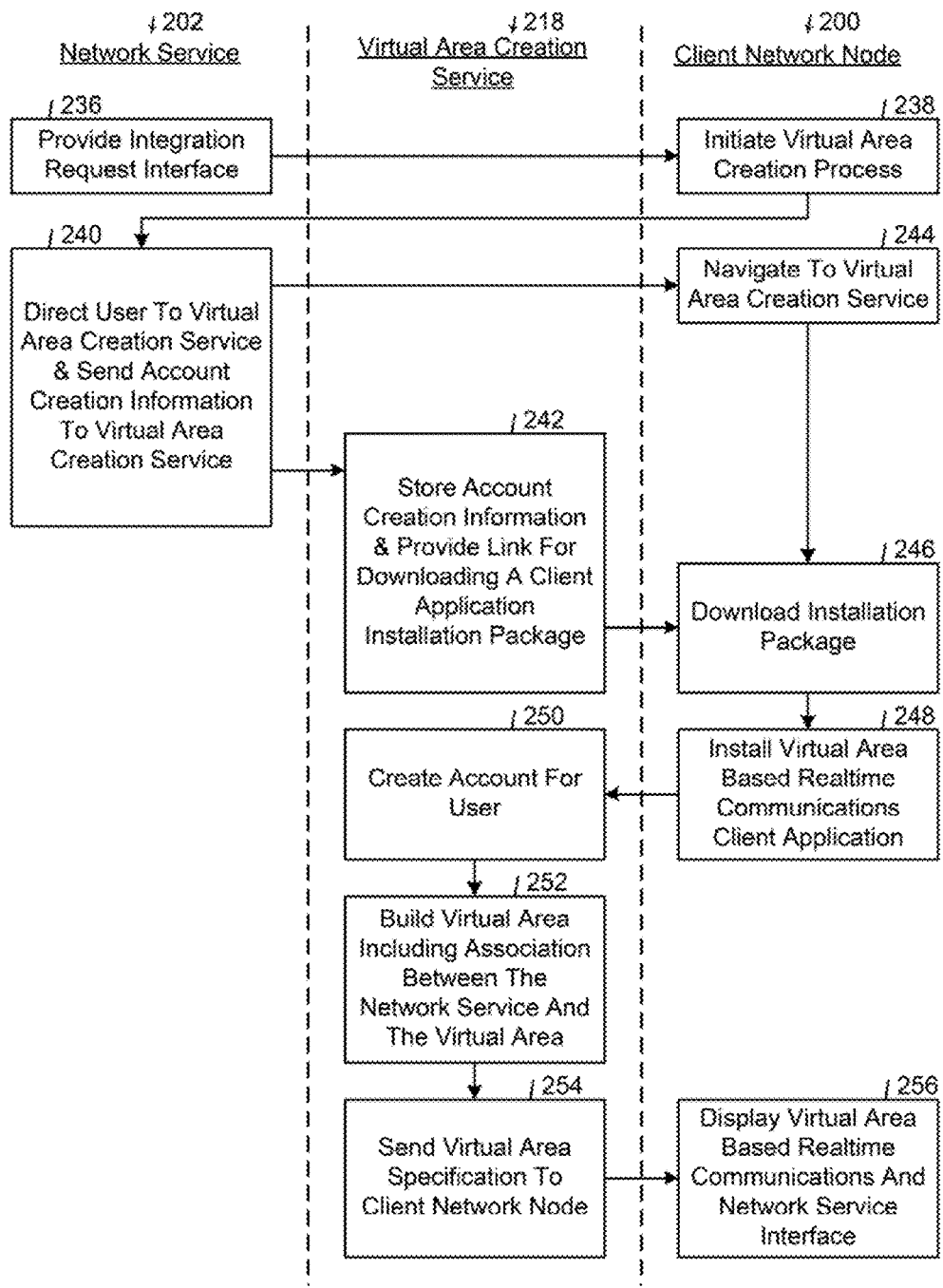
FIG. 5 is a flow diagram of an example of interactions between a network service, a virtual area creation service, and a client network node.

FIG. 5 shows a flow diagram of an example of interactions between the network service 202, the virtual area creation service 218, and a client network node 200.

In accordance with the flow diagram of FIG. 5, the network service 202 provides an integration request interface to the client network node 200 (FIG. 5, block 236). In some examples, the integration request interface is a web page that is associated with an integration component of the network service 202. The web page provides a user-activatable interface control (e.g., a button) that can be activated by the user to initiate a virtual area creation process.

Using the integration request interface, the client network node 200 initiates a virtual area creation process (FIG. 5, block 238). In some examples, a web browser component of the client network node 200 renders the integration request interface on a display, receives input from the user in connection with the user-activatable interface control, and transmits an indication of the activation of the user-activatable interface control to the network service 202.

Upon initiation of the virtual area creation process by the client network node 200, the network service 202 directs the user to the virtual area creation service and sends account creation information to the virtual area creation service 218 (FIG. 5, block 240).

In some examples, the user-activatable interface control in the integration request interface is associated with a URL for a landing web page provided by the virtual area creation service 218 for downloading an installation package containing the virtual area based realtime communications application. The user-activatable interface control typically also is associated with the integration component of the network service 202, which gathers account creation information and network service information relating to the network service 202 from one or more databases that are maintained by the network service 202. The integration component sends to the virtual area creation service 218 a structured version of the account creation information (e.g., HTTP POST Query String, JSON, XML) that can be interpreted by the virtual area creation service 218. In other examples, instead of having an integration component, the network service 202 publishes an application programming interface (API) that allows the virtual area creation service 218 to retrieve the communicant profile and network service information directly.

The account creation information typically includes virtual area information, communicant information, and network service information.

The virtual area information typically includes a virtual area type, name, and size. The virtual area type identifies a template for a specific type of virtual area (e.g., a virtual auditorium, a virtual support center, a virtual center of excellence, a virtual network operations center, and a virtual area that models a specific workflow process). Examples of different types of virtual areas are described in U.S. Provisional Patent Application No. 61/603,024, filed Feb. 24, 2012. The virtual area size may be specified in a variety of different ways, including by specifying a respective number of zones of one or more different types (e.g., individual offices, conference rooms, and auditorium), and a total number of communicant locations available for each zone type (i.e., the number of simultaneous users that can be present in the zone).

The communicant information includes a list of the communicants who are to be designated as members of the virtual area and profile information for each of the members. Communicants may be designated as members of the virtual area as a whole. Communicants also may be designated as owners or co-owners of particular zones (e.g., offices or other rooms) in the virtual area, where ownership is associated with one or more capabilities of the type described in U.S. Provisional Patent Application No. 61/535,910, filed Sep. 16, 2011. In some examples, an owner of a room has a capability to control access to the owned zone (e.g., through control of a door object). The profile information typically includes the user's contact information (e.g., a communication service handle, such as an electronic mail address, and name). In some examples, the network service 202 also obtains communicant profile information (e.g., a communication service handle and name) for other communicants that are associated with the user (e.g., communicants who share the same network service account with the user or are members of the same network service team as the user).

The network service information typically includes a URI for the network service (e.g., a URL for a homepage of the network service 202 or a URL for a web page tied to a particular network service project associated with the user's account). The network service information also may include a reference (e.g., a URI) to an iconographic representation of the network service (e.g., a logo or other icon associated with the network service), an identifier (e.g., a partner key) that identifies the network service 202 to the virtual area creation service 218, a definition for an object model to be used by the virtual area creation service 218, and parameters of the landing web page provided by the virtual area creation service 218. In some examples, the object model definition describes where an object that integrates the network service 202 into the virtual area will appear in the virtual area. The object model definition may include a Type field identifies the network service (e.g., AgileZen) and a Location field identifier that identifies the location of the object (e.g., ApplicationId for the virtual area+ZoneName for the zone in the virtual area+ObjectName for the object in the zone) is used to seed an object in a zone of the virtual area. In some examples, the landing page parameters include: a Partner ID that identifies which partner that will be associated with the virtual area; a Service Name that identifies the network service 202 to the user visiting the landing page; a Beauty Image URL for the image that promotes the virtual environment creation service with the network service 202; a Logo URL for a logo identifying the network service 202; a Space Name for the resulting virtual area that will be created (e.g., a pre-existing name for the user's team or project); and a Prop ID that identifies which prop should be placed in the resulting virtual area.

The virtual area creation service 218 stores the account creation information and provides a link for downloading a client application installation package (FIG. 5, block 242). The virtual area creation service 218 extracts the account creation information from the request received from the network service 202, generates a unique virtual area customization identifier (e.g., a universally unique identifier (UUID)) for the extracted information, and stores the extracted information in a database in association with the virtual area customization identifier such that the information can be retrieved based on the virtual area customization identifier. The link for downloading the client application installation package typically is provided on a web page that is cobranded with an identifier (e.g., a logo, brand name, or trademark) of a provider of the virtual area creation service and an identifier (e.g., a logo, brand name, or trademark) of a provider of the network service. In some examples, the virtual area creation service 218 associates the virtual area customization identifier with the client application installation package (e.g., by embedding it in the installation package).

The client network node 200 downloads the installation package (FIG. 5, block 246). A browser component of the client network node 200 typically downloads the installation package associated with the link provided by the virtual area creation service 218.

Using the installation package, the client network node 200 installs the virtual area based realtime communications application (FIG. 5, block 248). In this process, an installer component of the installation package installs the virtual area based realtime communications application, extracts the virtual area customization identifier from the installation package, and sends the virtual area customization identifier to the virtual area creation service 218.

The virtual area creation service 218 creates an account for the user (FIG. 5, block 250). In some examples, the virtual area creation service 218 uses the virtual area customization identifier received from the client network node 200 to retrieve the profile information for the user of the client network node 200 and network service information from the account creation information stored in the database, and sends the retrieved information to the client network node 200. The virtual area based realtime communications client application displays on client network node 200 a dialog box that includes account creation fields that are pre-populated with the information received from the virtual area creation service 218. For example, the dialog box may include a user name field, a user electronic mail address field, a network service URL field, and a network service iconographic reference field that are pre-populated with values received from the virtual area creation service 218. In some of these examples, the user may modify one or more of the pre-populated account creation fields. The account creation dialog box includes a Submit button that allows the user to instruct the installer component of the installation package to submit an account creation request form that includes the dialog box field values to the virtual area creation service 218. Based on receipt of the account creation request form, the virtual area creation service 218 creates an account for the user.

The virtual area creation service 218 builds a virtual area that includes an association between the network service 202 and the virtual area (FIG. 5, block 252). In some examples, the virtual area creation service 218 selects a specification of the virtual area, associates the user with the virtual area (e.g., stores an identifier of the user in a member list for the virtual area), establishes a presence for the user in a particular position in the virtual area, and associates the network service 202 with the virtual area. In some of these examples, the virtual area creation service 218 associates a URI of the network service 202 with the virtual area.

The virtual area creation service 218 sends a specification of the virtual area to the client network node 200 (FIG. 5, block 254). The virtual area creation service 218 also typically sends the user presence position and the network service 202 association to the client network node. In some examples, the virtual area creation service also sends contact information for other communicants that are identified in the account creation information as being associated with the virtual area.

The client network node 200 displays the virtual area based realtime communications and network service interface for realtime communications and shared interactions with the network service in the virtual area (FIG. 5, block 256).

The virtual area based realtime communications application typically includes functionality for inviting other communicants to the virtual area. In some examples, the virtual area creation service 218 sends contact information for other communicants that are associated with the virtual area from the virtual area creation service 218 to the client network node 200. The installer component of the installation package running on the client network node 200 displays an invitation dialog box with virtual area member fields (e.g., a member name field and a field for a member's communication service handle, such as an electronic mail address) that are pre-populated with the contact information received from the virtual area creation service 218. In some of these examples, the user may modify one or more of the pre-populated virtual area member fields. The invitation dialog box includes a Submit button that allows the user to instruct the installer component of the installation package to submit invitations to the members identified in the invitation dialog box using the invitation functionality of the virtual area based realtime communications application. Each invitation typically includes a link to the virtual area creation service that includes the virtual area customization identifier. In some examples, the link in the invitation directs a browser component of an invitee's client network node to the cobranded web page provided by the virtual area creation service 218 for downloading the client application installation package to the invitee's client network node.

In one exemplary use case, the user who initiates the virtual area creation process in connection with a particular network service (e.g., a project management service) is a leader of a team that uses the network service to provide joint access to one or more web documents relating to a particular project (e.g., a software development project). The network service 202 maintains a list of user names and contact information (e.g., email addresses) for the members of the team. The network service 202 includes this information in the account creation information that it sends to the virtual area creation service 218 (see FIG. 5, block 240). The virtual area creation service 218 stores this information in the database in association with the virtual area customization identifier so that it can be used by the team leader to invite the other members of the team to the virtual area that is created for the team.

Figure 6:
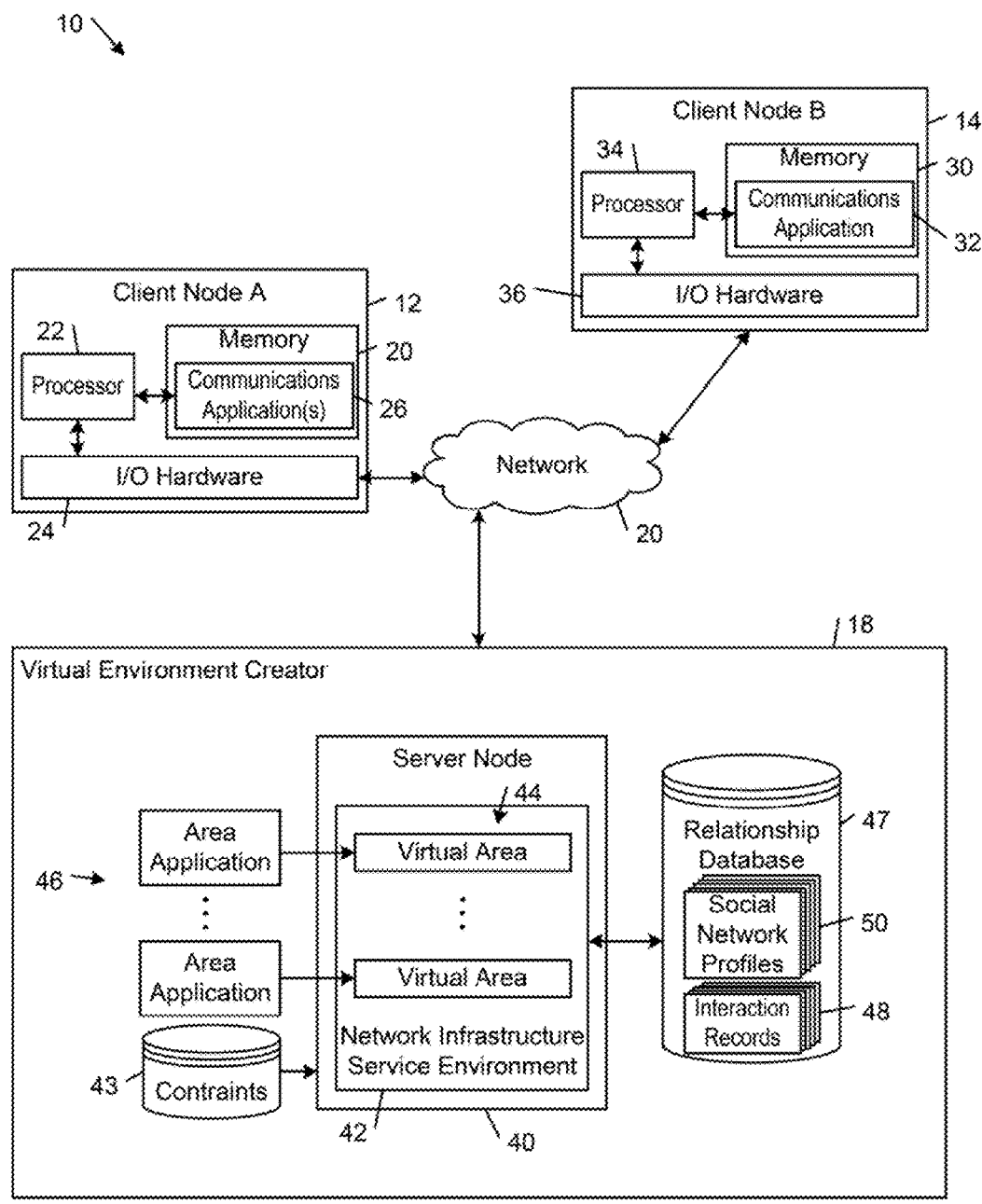
FIG. 6 is a diagrammatic view of an example of a network communications environment that includes first and second client network nodes and a virtual area platform that includes at least one server network node.

FIG. 6 shows an embodiment of an exemplary network communications environment 10 that includes a first client network node 12 (Client Node A), a second client network node 14 (Client Network Node B), and a virtual area platform 18 that provides an example of the virtual area creation service 218. The first client network node 12, the second client network node 14, and the virtual area platform 18 are interconnected by an example 20 of the network 206. The network 20 may include one or more of any of a local area network (LAN), a metropolitan area network (MAN), and a wide area network (WAN) (e.g., the internet). The network 20 typically includes a number of different computing platforms and transport facilities that support the transmission of a wide variety of different media types (e.g., text, voice, audio, video, and other data) between network nodes.

The first client network node 12 includes a computer-readable medium 22 (or "memory"), a processor 24, and input/output (I/O) hardware 26 (including a display). The processor 24 executes at least one communications application 26 that is stored in the memory 22. The second client network node 14 typically is configured in substantially the same general way as the first client network node 12, with a computer-readable medium 30 storing at least one communications application 32, a processor 34, and input/output (I/O) hardware 36 (including a display).

Each of the network nodes 12, 14 has a respective set of one or more sources and an exemplary set of one or more sinks. Exemplary sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized real-time data stream). Exemplary sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering real-time data streams different from those already described, or software that processes real-time streams for analysis or customized display).

The virtual area platform 18 includes at least one server network node 40 that provides a network infrastructure service environment 42 that manages sessions of the first and second client nodes 12, 14 in one or more virtual areas 44 in accordance with respective virtual area applications 46. One or more of the virtual area applications 44 typically are synchronous conferencing applications that support one or more types of communications between the client nodes 12, 14 (e.g., text chat, audio conferencing, video conferencing, application sharing, and file sharing). The network infrastructure service environment 42 typically includes one or more network infrastructure services that cooperate with the communications applications 28, 32 in the process of establishing and administering network connections between the client nodes 12, 14 and other network nodes. Among the network infrastructure services that are included in the example of the network infrastructure service environment 42 are an account service, a security service, an area service, a rendezvous service, an interaction service, and a capabilities engine. The area service administers a virtual area 44 by managing sessions of the first and second client nodes 12, 14 in the virtual area 44 in accordance with the virtual area application 46. Examples of the virtual area platform 18 and the virtual area applications 46 are described in U.S. Provisional Patent Application No. 61/563,088, filed Nov. 23, 2011. Examples of an account service, a security service, an area service, a rendezvous service, and an interaction service are described in U.S. patent application Ser. No. 12/630,973, filed Dec. 4, 2009. Examples of a capabilities engine are described in U.S. Provisional Patent Application No. 61/535,910, filed Sep. 16, 2011.

The network infrastructure service environment 42 maintains a relationship database 47 that contains the records 48 of interactions between communicants and social network profiles 50 that are associated with respective communicants. Each interaction record describes the context of an interaction between a pair of communicants. For example, in some examples, an interaction record contains one or more of an identifier for each of the communicants, an identifier for the place of interaction (e.g., a virtual area instance), a description of the hierarchy of the interaction place (e.g., a description of how the interaction room relates to a larger area), start and end times of the interaction, and a list of all files and other data streams that are shared or recorded during the interaction. In some examples, each interaction is tracked independently such that, for a given pair of communicants, there is a list of relationship event records, each of which records a single respective interaction (e.g., sent a chat message, streamed audio for 93 seconds, shared file X, etc.). Thus, for each realtime interaction, the network infrastructure service environment 42 tracks when it occurred, where it occurred, and what happened during the interaction in terms of communicants involved (e.g., entering and exiting), objects that are activated/deactivated, and the files that were shared. Each social network profile 50 typically includes: identity characteristics (e.g., name, age, gender, and geographic location information such as postal mailing address) that describe a respective communicant or a persona that is assumed by the communicant; explicit relationship information that is declared by the communicant; and relationship information that is inferred from the communicant's interactions in the network communication environment 10.

The communications applications 26, 32, the area applications 46, and the network infrastructure service environment 42 together provide a platform (referred to herein as "the platform") that administers the realtime connections with network nodes in a communication context that is defined by an instance of a virtual area subject to a set of constraints 43 that control access to the virtual area instance.

The communications applications 26, 32 present respective views of the virtual areas 44 in accordance with data received from the network infrastructure service environment 42 and provide respective interfaces for receiving commands from the communicants and providing a spatial interface that enhances the realtime communications between the communicants. The communicants typically are represented in the virtual areas 44 by respective avatars (e.g., sprites), which typically move about the virtual areas 44 in response to commands that are input by the communicants at their respective network nodes. In some examples, the communications applications 26, 32 establish realtime data stream connections between the first and second client network nodes 12, 14 and other network nodes sharing the virtual area 44 based on the positions of the communicants' avatars in the virtual areas 44 as described in U.S. Pat. Nos. 7,769,806 and 7,844,724.

Among the software components executing on the client network nodes 12, 14 are a user interface component and a browser component. The browser component provides a set of web browsing functions, including browser functions, document viewing functions, and data downloading functions. The user interface component generates a graphical user interface that interfaces the user to the realtime communications and network browsing functionalities of the browser component. The browser component may be integrated into the communications applications 26, 32 or it may be implemented by a separate browser component (e.g., a plug-in) that exposes an API through which the communications applications 26, 32 may call methods that are available from the browser component, including browsing methods, document viewing methods, and data downloading methods.

The network connections between network nodes may be arranged in a variety of different stream handling topologies, including a peer-to-peer architecture, a server-mediated architecture, and hybrid architectures that combine aspects of peer-to-peer and server-mediated architectures.

In some embodiments, the server network node 40 remotely manages client communication sessions and remotely configures audio and graphic rendering engines on the client network nodes 12, 14, as well as switching of data streams by sending instructions (also referred to as definitions) from the remotely hosted area applications 46 to the client network nodes in accordance with the stream transport protocol described in U.S. patent application Ser. No. 12/825,512, filed Jun. 29, 2010, the entirety of which is incorporated herein by reference. In some of these embodiments, the server node(s) 40 send to each of the client nodes 12, 14 provisioning messages that configure the client nodes 12, 14 to interconnect respective data streams between active ones of their complementary sources and sinks in accordance with switching rules specified in the server applications 46.

The platform tracks communicants' realtime availabilities and activities across the different communication contexts that are defined by the area applications 46. This information is presented to the communicants in the form of realtime visualizations that enable the communicants to make more informed network interaction decisions (e.g., when to interact with a contact) and encourages the communicants to initiate interactions with other communicants and to join contexts (e.g., an ongoing conversation between communicants) of which the communicants otherwise would not have been aware. In some embodiments, the realtime visualization includes visual cues as to the presence and activities of the communicants in the contexts of the server applications. The presentation of these visual cues typically depends on one or more of governance rules associated with the virtual areas 44, administrative policies, and user preferences (including preferences regarding the exportation of the user's presence and the connection of the user to areas and other communicants), which may define tiered relationship based predicates that control access to presence information and/or resources on a zone-by-zone basis.

A virtual area 44 may correspond to an abstract (non-geometric) virtual area that is defined with respect to abstract coordinates, or a visual virtual area that is defined with respect to one-, two- or three-dimensional geometric coordinates. Abstract virtual areas may or may not be associated with respective visualizations, whereas visual virtual areas are associated with respective visualizations.

In some of the examples that are described herein, the virtual areas are visual virtual areas of the type disclosed in U.S. Pat. Nos. 7,769,806 and 7,844,724. These visual virtual areas include physical geometry and collision geometry. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be painted onto the visual geometry and the texture, color, or intensity near the lighting effects may be modified. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

Some examples of the virtual area platform enable software application designers to define the semantics of position in an abstract virtual area (e.g., a software application or a computer data file). Through associations with respective connection rules, these position definitions can be used, for example, to drive connections to virtual areas, entries into virtual areas, connections to communicants and other sources or sinks of realtime data streams, and determinations of presence data relating to communicants, network resources, and network services. Additional details regarding systems and methods of defining the semantics of position in abstract virtual areas are described in U.S. application Ser. No. 12/631,008, which was filed on Dec. 4, 2009.

A virtual area typically includes one or more zones. A zone may be a rendered spatial extent, a set of rules applied to a spatial extent, or both. Zones may be arranged hierarchically in a virtual area, with an outermost zone (referred to herein as the "Global Governance Zone") enclosing all other zones in the virtual area. Within the Global Governance Zone, there can be location zones (e.g., rooms of a virtual area) or smaller governance zones that enclose a group of location zones and provide regions of governance on the map. A zone definition typically also includes one or more channel definitions that describe how to create respective content specific communications channels in the zone and specify the information about the channel that is published to a client network node that becomes present in the zone. A channel is always uniquely defined point-to-point and is unique to a session and a virtual area application.

Examples of the types of rules that may be associated with a zone include switching rules, governance rules, and permission rules.

Switching rules govern realtime stream connections between network nodes that are linked to the virtual area (e.g., network nodes that are associated with objects, such as avatars, in the virtual area). The switching rules typically include a description of conditions for connecting sources and sinks of realtime data streams in terms of positions in the virtual area. Each switching rule typically includes attributes that define the realtime data stream type to which the rule applies and the location or locations in the virtual area where the rule applies. In some examples, each of the rules optionally may include one or more attributes that specify a required role of the source, a required role of the sink, a priority level of the stream, and a requested data routing topology. In some examples, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the area clients or only to respective connections with individual area clients. An example of a policy rule is a proximity policy rule that only allows connections of sources with compatible sinks that are associated with respective objects that are within a prescribed distance (or radius) of each other in the virtual area. The network connections between network nodes may be arranged in a variety of different data routing topologies, including a peer-to-peer topology, a mediated topology (i.e., a topology in which connections between network nodes are mediated by another network node, such as a server network node, a client network node, or a network switch), and hybrid architectures that combine aspects of peer-to-peer and mediated architectures. In some examples, the switching rules dictate how local connection processes executing on each of the network nodes establishes communications with the other network nodes based on the locations of the associated objects in the zones of the virtual area. A switching rule also may define a direct connection between network nodes or an indirect connection through an intermediate network node.

Governance rules control who has access to resources (e.g., the virtual area itself, regions with the virtual area, and objects within the virtual area), who has access to data (e.g., data streams and other content) that is associated with the virtual area, what is the scope of that access to the data associated with the virtual area (e.g., what can a user do with the data), and what are the follow-on consequences of accessing that data (e.g., record keeping, such as audit logs, and payment requirements). In some examples, an entire virtual area or a zone of the virtual area is associated with a "governance mesh" that enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

A permission rule defines a respective capability requirement (e.g., for a respective action, behavior, or state) in terms of one or more capabilities, attributes, and settings, which may be persistent or transient. Examples of permission rules include: a rule that conditions a communicant's ability to enter a target zone on the communicant having a CanEnterZone capability for the target zone; a rule that conditions the ability of a grantee communicant to open a target door of a target room on the grantee communicant having a CanOpenDoor capability for the target room; and a rule that conditions the transmission of a message describing the state of a particular communicant's avatar in a zone to a recipient having a CanSeeState capability for the particular communicant in the zone. A capability provides permission for a client to perform some action within the application. For example, a client may be granted the capability "CanEnterZone" for a specific zone within a virtual area that has been defined with that capability requirement. The client that has the capability can enter the zone, whereas a client without the capability would have their RDS state change rejected when they tried to enter the zone. Examples of capabilities systems for administering permission rules are described in U.S. Provisional Patent Application No. 61/535,910, filed Sep. 16, 2011.

As explained above, the zones of a virtual area can be associated with respective switching rules, each of which instructs the area service to connect sources of a respective data stream type that are associated with a designated source zone with sinks of the respective realtime data stream type that are associated with a designated sink zone. Network nodes can establish respective presences in the zones of a virtual area. In some examples, network nodes associated with respective objects (e.g., avatars representing the communicants operating the network nodes) that can be moved to different locations in the virtual area, and the network nodes are present in the zones in which the associated objects are located. The area service administers data stream connections between the network nodes based on the switching rules, the respective sources and sinks associated with the network nodes, and the respective zones of the virtual area in which the objects are located.

Figure 7A:
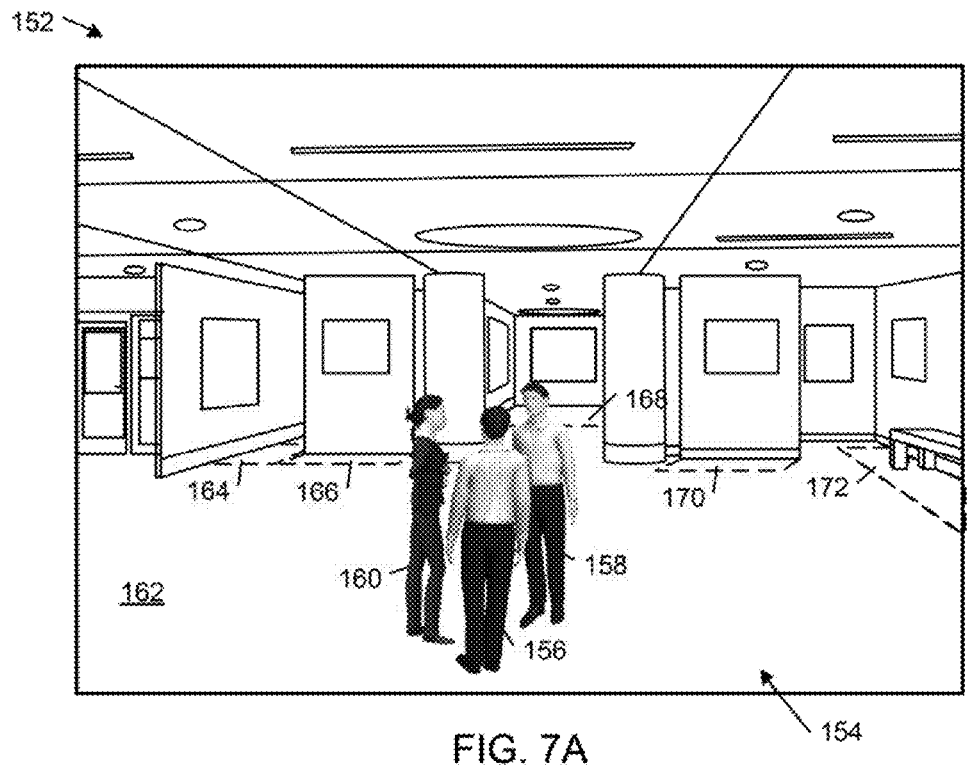
FIG. 7A is a diagrammatic view of an example of a graphical user interface showing a perspective view of a virtual area.

FIG. 7A shows an example of a graphical user interface 152 that presents a two-dimensional view of a visual virtual art gallery area 154. Communicants are represented in the virtual area 154 by respective avatars 156, 158, 160, each of which may have a respective role (e.g., a curator, an artist, and a visitor) in the virtual area 166. The virtual area 154 includes zones 162, 164, 166, 168, 170, 172. (During a typical communication session, the dashed lines demarcating the zones 162-172 in FIG. 7A are not visible to the communicants although there may be visual cues associated with such zone boundaries.) In some examples, each of the zones 162-172 has a respective zone boundary that is associated with a respective <zone_mesh> tag that has a number of attributes (e.g. <zone>, <stream> and <sink> tags) in accordance with the COLLADA Streams Reference specification described in U.S. Pat. Nos. 7,769,806 and 7,844,724. In other examples, zones are associated with one or more respective control channels on which data streams of respective data types are sourced from the zones and/or control channels that are published in the zones and can be subscribed to by network nodes in the zones.

Figure 7B:
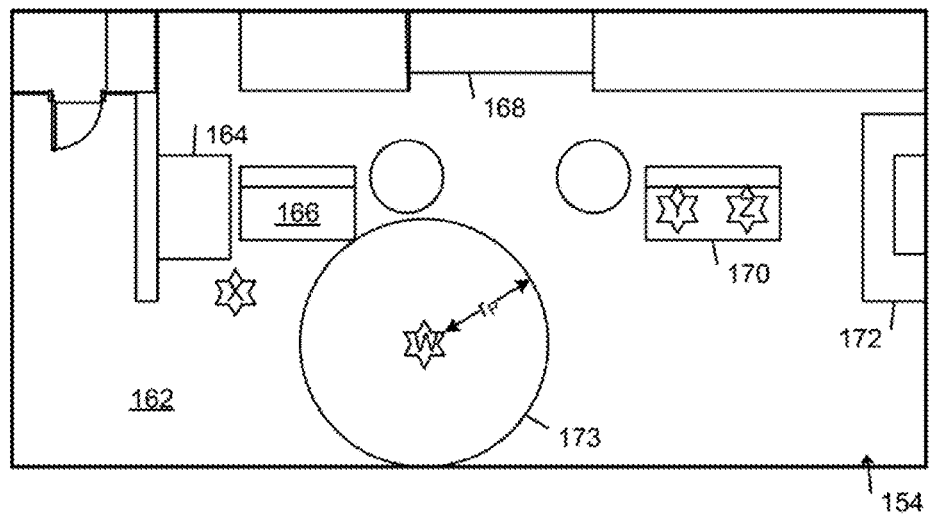
FIG. 7B is a diagrammatic plan-view of the virtual area shown in FIG. 7A that is populated with four avatar objects.

FIG. 7B shows a plan view of the virtual art gallery area 154 at a time when it is populated with four avatars W, X, Y, and, Z. The avatars W and X are positioned in the zone 162 and the avatars Y and Z are positioned in the zone 170. For the purpose of this illustrative example:

each of the avatars W-Z is associated with voice, video, and chat source types and sink types;
the switching rules for zone 162 specify that
each voice source that is associated with an avatar within the zone 162 is to be connected to every voice sink within the zone 162,
each video source that is associated with an avatar within the zone 162 is to be connected to every video sink within the zone 162, and
each chat source that is associated with an avatar within the zone 162 is to be connected to every chat sink within the zone 162;
the switching rules for zone 170 specifies only that that each voice source that is associated with an avatar within the zone 170 is to be connected to every voice sink within the zone 170; and
the server node executes a message handling service for the virtual area 154 that implements, on top of the zone switching rules, a proximity policy rule that only allows connections of sources with compatible sinks that are associated with respective objects that are within a prescribed distance (or radius), $r_P$, of each other in the virtual area.

In this example, the switching rules and the proximity policy rule provide respective switching conditions that determine how the connections between the avatars W, X, Y, and Z are established.

In operation, the message handling service for the virtual area 154 sends instructions for the area client node that is associated with avatar W to connect to the real-time voice, video, and chat streams that are sourced from the area client node that is associated with avatar X whenever avatar X is positioned within a proximity zone 173, which defined by the prescribed distance $r_P$, around avatar W. Likewise, the message handling service sends instructions for the area client node that is associated with avatar X to connect to the real-time voice, video, and chat streams that are sourced from the area client node that is associated with avatar W whenever avatar W is positioned within the prescribed distance $r_P$ of avatar X. Since avatar X currently is outside the proximity zone 173 of avatar A, and vice versa, the nodes associated with avatars W and X are not connected to each other in the current state shown in FIG. 7B.

Since the zone 170 only allows voice connections, the message handling service sends instructions for the area client node that is associated with avatar Y to connect to only the real-time voice stream that is sourced from the area client node that is associated with avatar Z (assuming the proximity condition specified in the proximity policy rule is satisfied). Similarly, the message handling service sends instructions for the area client node that is associated with avatar Z to connect to only the real-time voice stream that is sourced from the area client node that is associated with avatar Y (assuming the proximity condition specified in the proximity policy rule is satisfied).

Since the switching rules for zones 162 and 170 do not allow connections between zones 162 and 170, the sources and sinks that are associated with avatars W and X are not connected to any of the sources and sinks that are associated with avatars Y and Z, even if the proximity condition specified in the proximity policy rule is satisfied.

In some examples, a non-rendered governance zone typically encompasses a collection of one or more rendered location zones. One or more control channels are defined within a governance zone. A governance zone functions as a "sink" for data sent on the associated control channel, whereas a location zone that specifies the same control channel functions as the "source" of the control channel data. A user who is present in any one of the location zones within a governance zone is also present within the governance zone.

A control channel is a collection of channels that share a common definition that is managed by exactly one area/zone manager, which is a component of the area service (examples of area/zone managers are described in U.S. Provisional Patent Application No. 61/563,088, filed Nov. 23, 2011). A control channel is published by its corresponding zone manager when a communicant enters a zone that the zone manager has responsibility for. For example, a chat control channel describes the chat channels that exist (i.e., the channels that contain the chat data). When a communicant enters a room, the chat control channel publishes the chat channels that are available for the room, the communicant's client communicants application subscribed to a particular chat channel and the chat history was sent down to the client communications application on that channel. A single area/zone manager can manage multiple control channels. When a message is passed from a message handler to a zone manager, the message handler sends the zone manager the ID of the control channel on which the message came on so that the zone manager operate in the correct context defined by the control channel ID.

Figure 8:
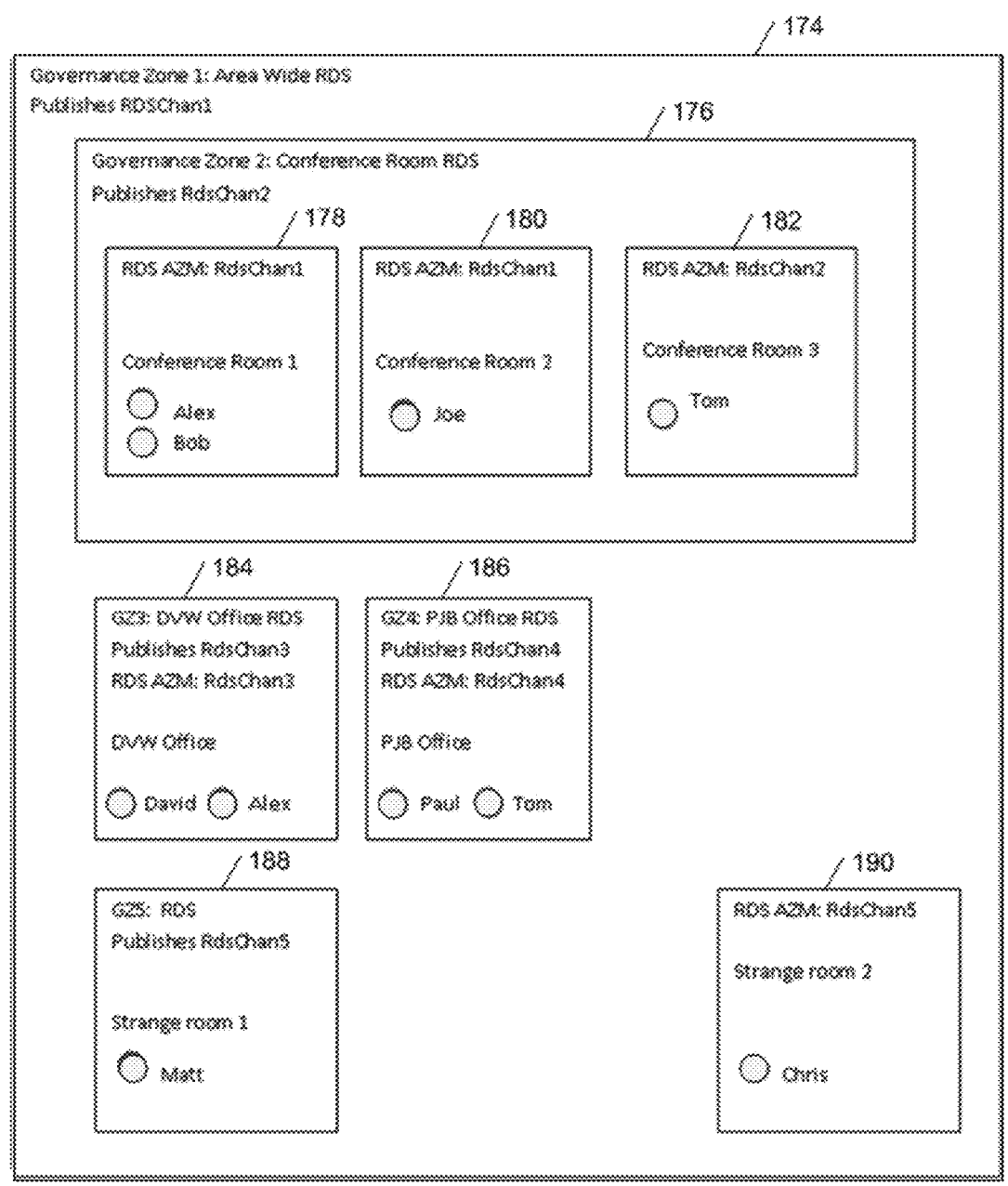
FIG. 8 is a diagrammatic plan view of an example of a zone map.

FIG. 8 shows an example of a realtime data stream (RDS) zone map that defines how RDS streams are sourced and sunk in a virtual area. In some examples, the RDS streams carry RDS data indicating activity on one or more communicant communications channels (e.g., communicant audio channels, communicant chat channels); the RDS data is used to show visual cues of indicating current communicant activities in a virtual area. The virtual area specification may include analogous zone maps for other channels that are defined for the virtual area. Some control channels, such as the session control channel and the area definition channel, only have a single instance. The virtual area includes seven location zones: Conference Room 1, Conference Room 2, Conference Room 3, DVW Office, PJB Office, Strange Room 1, and Strange Room 2. The virtual area also includes five governance zones: a global area wide zone 174, a zone 176 containing all three conference rooms, zones 178, 180, 182, 184, 186 for each office (which coincide with the location zones), and zones 188, 190 for Strange Room 1 and Strange Room 2.

Alex is present in Conference Room 1, GZ1, GZ2 and DVW Office (GZ3), Bob is present in Conference Room 1, GZ1 and GZ2, Joe is present in Conference Room 2, GZ1 and GZ2, Tom is present in Conference Room 2, GZ1, GZ2 and PJB Office/GZ4, David is present in DVW Office/GZ3 and GZ1, Paul is present in PJB Office/GZ4 and GZ1, Matt is present in Strange Room 1/GZ5 and GZ1, and Chris is present in Strange Room 2 and GZ1.

There are five control channels for RDS, one published by each zone except zone 190, which does not publish any RDS data: RDSChan1 is published by zone 174; RdsChan2 is published by zone 176; RdsChan3 is published by zone 184; RdsChan4 is published by zone 186; and RdsChan5 is published by zone 188. RDS activity in a zone is sent out on all RDS zone manager control channels for that zone and delivered to all users present in the governance zones that publish those control channels.

Activity in any of conference room 1 or conference room 2 is published on RdsChan1, which is published by an area/zone manager for governance zone 174. Since every user in the area is in governance zone 174, all users in the area are subscribed to RdsChan1 and see the RDS activity in Conference Rooms 1 and 2 (governance zones 178, 180). An area/zone manager for governance zone 182 publishes activity in Conference Room 3 (governance zone 182) on RdsChan2. In this case, only Alex, Bob, Joe and Tom are in governance zone 176, so only they are subscribed to the channel and see Tom's Activity in Conference Room 3. Since RdsChan1 is not a control channel for Conference Room 3, activity in Conference Room 3 is not broadcasted on that channel. Activity in the DVW Office is sent out on RdsChan3, which is published by governance zone 184 and therefore is only visible to David and Alex since they are the only ones present in that zone. Likewise, activity in the PJB Office is sent out on RdsChan4, which is published by governance zone 186 and therefore is only visible to Paul and Tom since they are the only ones present in that zone. Activity in Strange Room 1 is not visible anywhere, not even in Strange Room 1 since it doesn't specify an RDS Control Channel. Activity in Strange Room 2 is sent out on RdsChan5, which is published by governance zone 188 and therefore is broadcast to Matt in Strange Room 1. Thus, no one can see Matt's activity in Strange Room 1 (not even Matt) and only Matt can see Chris's activity in Strange Zone 2.

As explained above, the zones of a virtual area can be associated with respective switching rules, each of which instructs the area service to connect sources of a respective data stream type that are associated with a designated source zone with sinks of the respective realtime data stream type that are associated with a designated sink zone. Network nodes can establish respective presences in the zones of a virtual area. In some examples, network nodes associated with respective objects (e.g., avatars representing the communicants operating the network nodes) that can be moved to different locations in the virtual area, and the network nodes are present in the zones in which the associated objects are located. The area service administers data stream connections between the network nodes based on the switching rules, the respective sources and sinks associated with the network nodes, and the respective zones of the virtual area in which the objects are located.

In some examples, a virtual area includes multiple zones each of which supports an independent communication session between network nodes in the zone. For example, a virtual area may include zones in which audio, video, and text chat channel connections are established only between the sources and sinks of network nodes that are in the same zone. In these examples, the spatial visualizations of the virtual area that are presented on the client network nodes show, in a single view, all the independent communications that are occurring in the zones of the virtual area. This allows a user to see multiple simultaneous independent communication interactions in a single view and thereby quickly learn who is meeting with whom and the contexts of those meetings (as defined by the zones in which the meetings are occurring).

Figure 9:
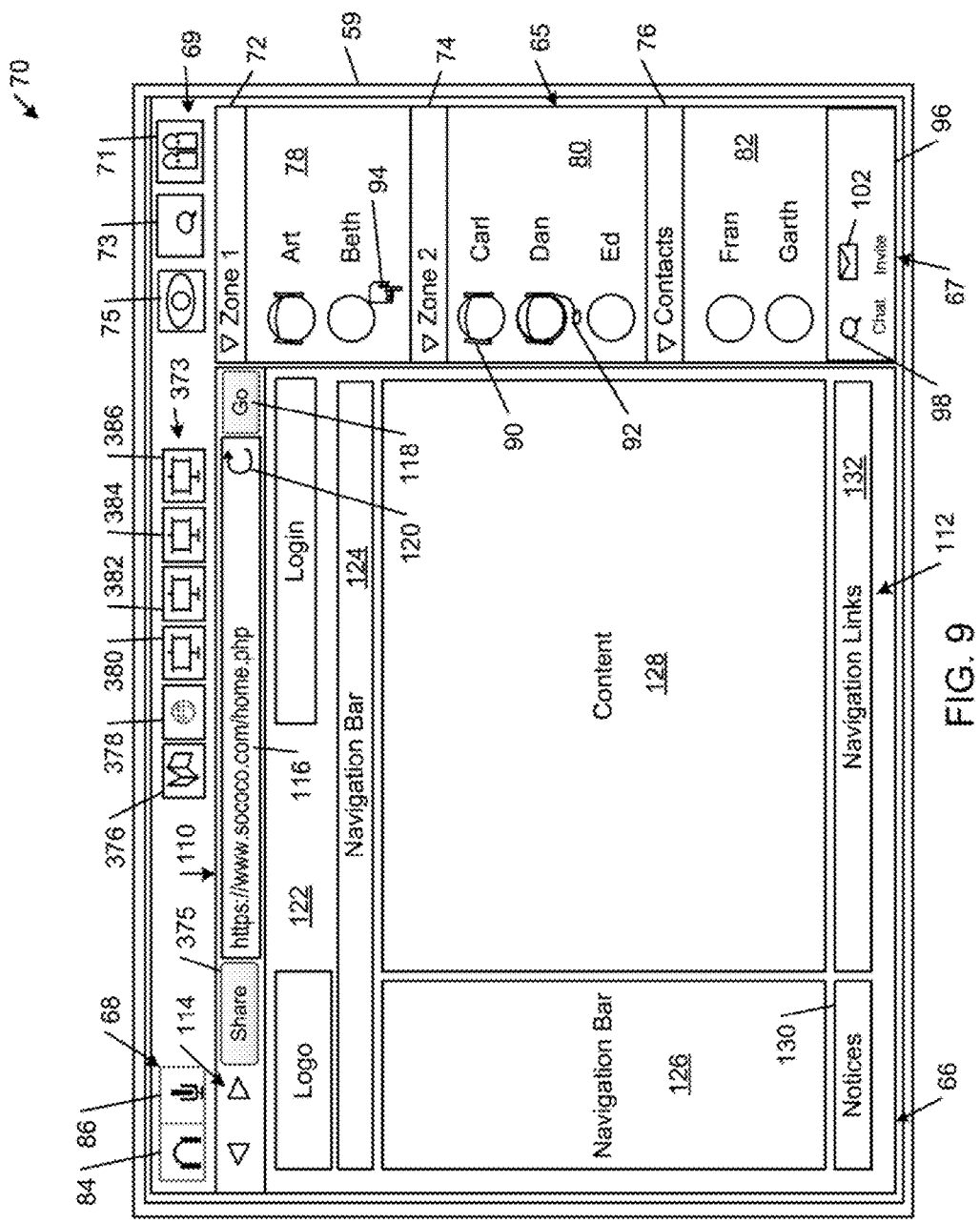
FIGS. 9-11 are respective diagrammatic views of graphical user interface examples.

FIG. 9 shows an exemplary graphical user interface 70 that is generated by an example of the communications application 26 in a window 59 on a display of the client network node from which a user of the client application ("Art" in this example) is operating. The graphical user interface 70 includes a people panel 65, a viewer panel 66, a people interaction toolbar 67, an audio interaction toolbar 68, and a set of panel view controls 69.

The people interaction toolbar 67 includes a Chat button 98 and an Invite button 102. Selection of the Chat button 98 opens a chat panel 140 (see FIG. 11) that enables Art to initiate a chat with other communicants who are present in the area application where Art is present (i.e., Zone 1 in the illustrated example). Selection of the Invite button 102 opens an Invite window that enables Art to invite one or more communicants to a selected virtual area location (e.g., an area application or zone within that area application). Additional details regarding embodiments of the methods and functions invoked by the Chat button 98 and the Invite button 102 are described in U.S. patent application Ser. No. 12/354,709, filed Jan. 15, 2009, and U.S. Provisional Patent Application No. 61/373,914, filed Aug. 16, 2010.

The audio interaction toolbar 68 includes a headphone control 84 that enables Art to toggle on and off the local speakers of the client network node, and a microphone control 86 that enables Art to toggle on and off the local microphone of the client network node.

The panel view controls 69 include a people panel button 71 for opening and closing the people panel 65, a chat panel button 73 for opening and closing the chat panel 140 (see FIG. 11), and a viewer panel button 75 for opening and closing the viewer panel 66.

The people panel 65 depicts the realtime availabilities and activities of some or all of Art's contacts across different communication contexts. In the example shown in FIG. 9, the people panel 65 shows Art's communicants segmented into two zone groups 72, 74 and a contacts group 76. The zone groups 72, 74 correspond to respective zones of a particular one of the area applications 44 of which Art is a member and is present. The contacts group 76 contains all or a selected portion of Art's contacts that are not represented in any of the zone groups. The first zone group 72 of communicants is contained within a section 78 (labeled with a header bar entitled "Zone 1") that identifies all the communicants who are present in Zone 1 of the particular virtual area application. The second virtual area group 74 of communicants is contained within a section 80 (labeled with a header bar entitled "Zone 2") that identifies all the communicants who are present in Zone 2 of the particular virtual area application. The contacts group 76 of communicants is contained within a section 82 (labeled with a header bar entitled "Contacts") that identifies all of Art's contacts who are not present in any of the first and second zone groups 72, 74.

In the example shown in FIG. 9, the sections 78, 80 of the people panel contain the graphical representations (avatars) of the communicants (including at least one of Art or Art's contacts) who currently are present in the respective zones of the particular virtual area application 46, and the contacts section 82 contains graphical representations (avatars) of all of the remaining ones of Art's contacts that are not present in any of Zone 1 and Zone 2. In the illustrated example: Art and Beth are present Zone 1; Carl, Dan, and Ed are present in Zone 2; and Fran and Garth are contacts of Art who are not present in the virtual area containing Zone 1 and Zone 2

Each communicant is represented graphically by a respective circular sprite that is labeled with a respective user name of the communicant (i.e., "Art," "Beth," "Carl," "Dan," "Ed," "Fran," and "Garth"). Each sprite also may be associated with a respective status line that includes additional information about the communicant. In some embodiments, each status line can include one or more of the following information: location of presence (e.g., a server application or a zone of that sever application); availability (e.g., busy, idle); a status message (e.g., "Out of the office next Wednesday"); and the name of the client node from which the communicant is operating (e.g., "workstation 1" or "mobile phone"). In some embodiments, the ordering of the spatial positions (e.g., from top to bottom) of the communicant avatars in each of the sections 78, 80, 82 is alphabetical by user name. In other embodiments, the spatial positions of the communicant avatars in each of the server application sections 78, 80 are ordered in accordance with the temporal ordering of the communicants in terms of the times when the communicants established their respective presences with the server applications. The spatial positions of the communicant avatars in the contacts section 82 may be sorted alphabetically by user name, according to frequency of contact, according to recentness of contact, or according to other sorting or filtering criteria.

The activities of the communicants in the contexts of the area applications 44 may be inferred from the activities on communication channels over which the respective communicants are configured to communicate. The activities on the communication channels are shown in the graphical user interface 70 by visual cues that are depicted in association with the graphical representations of the communicants in the sections 78, 80, 82. For example, the "on" or "off" state of a communicant's local speaker channel is depicted by the presence or absence of a headphones graphic 90 on the communicant's sprite. When the speakers of the communicant who is represented by the sprite are on, the headphones graphic 90 is present (see sprites Art, Carl, and Dan) and, when the communicant's speakers are off, the headphones graphic 90 is absent (see sprites Beth and Ed). The "on" or "off" state of the communicant's microphone is depicted by the presence or absence of a microphone graphic 92 on the communicant's sprite. When the communicant's microphone is on, the microphone graphic 92 is present (see sprite Dan); and, when the communicant's microphone is off, the microphone graphic 92 is absent (see sprites Art, Beth, Carl, and Ed). The headphones graphic 90 and the microphone graphic 92 provide visual cues of the activity states of the communicant's sound playback and microphone devices. In addition, the current activity state of a communicant's microphone channel is indicated by a dynamic visualization that lightens and darkens the communicant's avatar in realtime to reflect the presence or absence of audio data on the microphone channel. Thus, whether or not their local speakers are turned on, communicants can determine when another communicant is speaking by the "blinking" of the coloration of that communicant's avatar. The activity state of a communicant's text chat channel is depicted by the presence or absence of the hand graphic 94 adjacent the communicant's sprite (see sprite Beth). Thus, when a communicant is transmitting text chat data to another network node the hand graphic 94 is present, and when a communicant is not transmitting text chat data the hand graphic 94 is not present. In some embodiments, text chat data is transmitted only when keyboard keys are depressed, in which case the visualization of the communicant's text channel appears as a flashing on and off of the hand graphic 94.

In the example shown in FIG. 9, members of an area application are able to receive the visual cues of the communicant activities occurring in the contexts defined by the zones of that area application whether or not the members are present in the zone in which the communicant activities are occurring. Thus, the graphical user interface 70 that is presented to Art shows visual cues indicating the communication channel activities of the communicants present in Zone 1 (where Art is present) and the communication channel activities of the communicants present in Zone 2 (where Art is not present).

Additional details regarding embodiments of the people panel 65 are described in U.S. Provisional Patent Application No. 61/373,914, filed Aug. 16, 2010, and U.S. patent application Ser. No. 12/354,709, filed Jan. 15, 2009.

The viewer panel 66 includes a navigation area 110 and a display area 112.

The navigation area 110 includes forward and back buttons 114, a location bar 116, a Go button 118, and a reload button 120. The forward and back buttons 114 enable a user to traverse a navigation stack of uniform resource identifier (URI) addresses (e.g., a linked list of previously visited URLs). The location bar 116 allows a user to specify a URI address of a network resource, and the Go button 118 invokes one or more browser functions on the client network node to navigate to the specified URI address and render the network resource at the specified URI address in the display area 112. The reload button 120 invokes one or more browser functions on the client network node to reload the graphic representation of the network resource currently displayed in the display area 112.

The display area 112 contains the rendered depictions of network resources located at the URI address specified in the navigation area 110. In the example shown in FIG. 9, the viewer panel 66 is in the browser view mode and shows a rendered view of the network resource (a web page in this example) that is located at the URL https://www.sococo.com/home.php, as indicated in the location bar 116. In the illustrated example, the display area 110 shows a web page that includes a header section 122, a top navigation bar 124, a side navigation bar 126, a contents section 128, a notices section 130, and a navigation links section 132.

In addition to the control and panel elements of the graphical user interface 70 (e.g., the people panel 65, the viewer panel 66, the people interaction toolbar 67, the audio interaction toolbar 68, and the panel view controls 71, 73, 75), the graphical user interface 70 includes a Share button 375 and a set 373 of Viewer Panel control buttons, including a Map button 376, a Browse button 378, and four View Screen buttons 380-386. The Share button 375 initiates a screen share of the contents of the display area 112 of the viewer panel 66 in connection with a view screen object in a virtual area. These contents include, for example, renderings of any information that is received by the browser component in connection with the network resource identified in the location bar 116, and a document or application that is being shared by the user in connection with a view screen object in a virtual area. The Map button 376 sets the view presented in the viewer panel 66 to a map view of the virtual area. The Browse button 378 sets the view presented in the viewer panel 66 to a browser view. Each of the four View Screen buttons 380-386 sets the viewer panel 66 to display the content being shared in connection with a corresponding one of the view screens in the virtual area.

Figure 10:
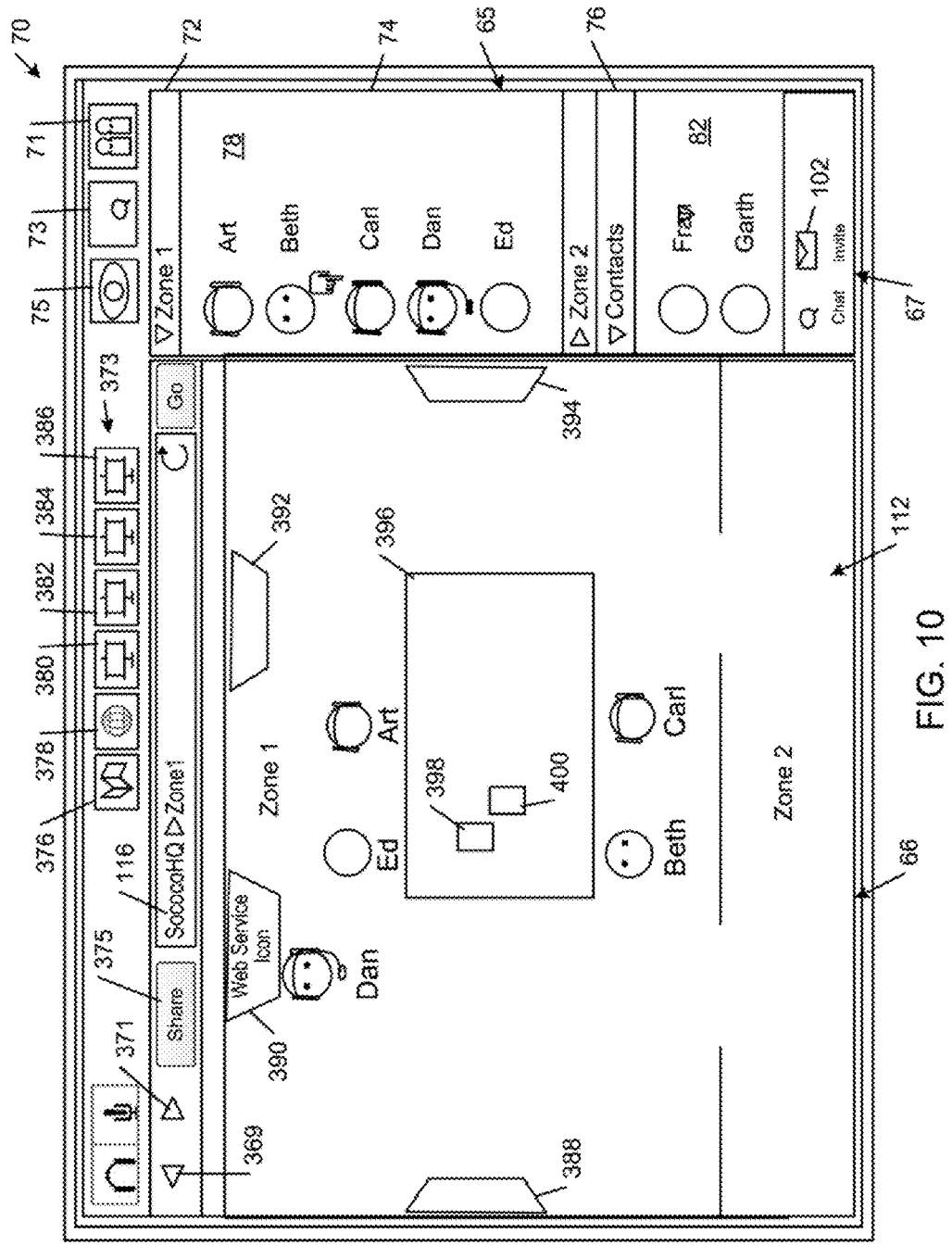

FIG. 10 shows an example of the graphical user interface 70 in the Map view mode presenting in the viewer panel 66 a rendered view of a zone (i.e., Zone 1) of the virtual area SococoHQ that is located at the location SococoHQ/Zone1, as indicated in the location bar 110.

Each of the communicants who is present in the virtual area is represented graphically by a respective avatar that corresponds to the communicant's avatar that is shown in the people panel 65. The virtual area is represented graphically by a two-dimensional top view of a rectangular space. In some examples, the communicants' sprites automatically are positioned in predetermined locations (or "seats") in the virtual area when the communicants initially enter the virtual area.

The virtual area includes four view screen objects 388, 390, 392, 394 and a table object 396. Communicants interact with the objects by selecting them with an input device (e.g., by single-clicking on the objects with a computer mouse, touch pad, touch screen, or the like).

The view screen objects 388-394 are associated with application sharing functionality of the platform that enables communicants to share applications operating on their respective client network nodes. The application sharing functionality is invoked by activating a view screen object (e.g., by single-clicking the view screen object with an input device). In some embodiments, the platform provides visual cues that indicate whether or not a communicant is sharing an application over an application sharing channel. In response to a communicant's selection of the view screen object, the communicant's sprite automatically is moved to a position in the graphical representation of the virtual area that is adjacent the view screen object. The position of a communicant's sprite adjacent the view screen object indicates that the communicant currently is sharing or is about to share an application with the other communicants in the virtual area. In addition, the avatar of each communicant who is viewing a shared application (including the sharing communicant) is depicted with a pair of "eyes" to indicate that the represented communicants are viewing the content being shared in connection with the view screen objects (see, e.g., the avatars of Beth and Dan in FIG. 10). The graphical depiction of view screen object is changed depending on whether or not an active application sharing session is occurring. For example, the depicted color of the view screen object may change from a brighter color during an active application sharing session to a darker color when there is no application sharing taking place. Examples of the application sharing process are described in connection with FIGS. 26-28 of U.S. patent application Ser. No. 12/354,709, filed Jan. 15, 2009, and in U.S. patent application Ser. No. 12/418,270, filed Apr. 3, 2009.

Any of the viewscreen props 388-394 may be associated with respective uniform resource identifiers (URIs) of network resources (e.g., network services) to enable communicants to interact with and share information associated with the network resources in connection with the viewscreen objects as described in U.S. patent application Ser. No. 13/399,737, filed Feb. 17, 2012. In the example shown in FIG. 10, the viewscreen object 390 is associated with the URL of a network service and an iconographic representation of the network service (represented by the label "Web Service Icon") is displayed in association with the viewscreen object 390.

The table object 396 is associated with file sharing functionality of the platform that enables communicants to upload computer data files to server storage in association with the virtual area and to download data files that are associated with the virtual area from the server storage to the respective client network nodes. In example shown in FIG. 10, there are two document objects 398, 400 that are associated with the table object 396. The document objects 398, 400 are linked to respective documents that are have been shared in the virtual area and stored in server storage. Any of the document objects 398, 400 may be selected by a communicant (e.g., by double-clicking the document object 190 with an input device, such as a computer mouse) to initiate downloading of the associated document to the communicant's client network node. Additional details regarding the structure, function, and operation of the table prop 396 may be obtained from U.S. patent application Ser. No. 12/354,709, filed Jan. 15, 2009.

In the Map view mode, the navigational controls of the graphical user interface 70 allow the user to traverse a path through the virtual environment in accordance with a navigational model that is tied to the underlying spatial hierarchy of virtual area locations and objects within the locations. The network infrastructure service environment records the path traversed by the user. In some embodiments, the network infrastructure service environment records a history that includes a temporally ordered list of views of the virtual area locations that are presented to the user as the user navigates through the virtual area. Each view typically corresponds to a view of a respective renderable zone of the virtual area. In these embodiments, the navigation controls enable the user to move to selected ones of the zones in the history. The navigation controls also include a graphical representation of a depth path that shows the location in the spatial hierarchy that corresponds to the user's current view of the virtual area. In some embodiments, the graphical representation of the depth path includes a respective user-selectable link to a respective view of each of the preceding levels in the spatial hierarchical model of the virtual area above the current view. The back button 369 corresponds to a backward control that enables the user to incrementally move backward to preceding ones of the zones in the history of the zones that were traversed by the user. The forward button 371 corresponds to a forward control that enables the user to incrementally move forward to successive ones of the zones in the history of the zones that were traversed by the user. Some examples additionally include a placemarks button that activates a placemarking control for storing links to zones and a placemark navigation control for viewing a list of links to previously placemarked zones. In response to user selection of the placemarking control, a placemark is created by storing an image of the location shown in the current view in association with a hyperlink to the corresponding location in the virtual area. In response to a user selection of the placemark navigation control, a placemarks window is presented to the user. The placemarks window includes live visualizations (showing, e.g., where communicants are located and visual cues of their realtime activities) of all locations that have been placemarked by the user. Each of the images in the placemarks window is associated with a respective user-selectable hyperlink. In response to user selection of one of the hyperlinks in the placemarks window, a view of the virtual area corresponding to the location associated with the selected hyperlink is automatically displayed in the browsing area of the graphical user interface 70. Some examples include home button corresponds to a control that returns the user to a view of a designated "home" location in the virtual environment. Additional details regarding the structure, function, and operation of examples of the navigation controls are described in U.S. patent application Ser. No. 12/354,709, filed Jan. 15, 2009.

Figure 11:
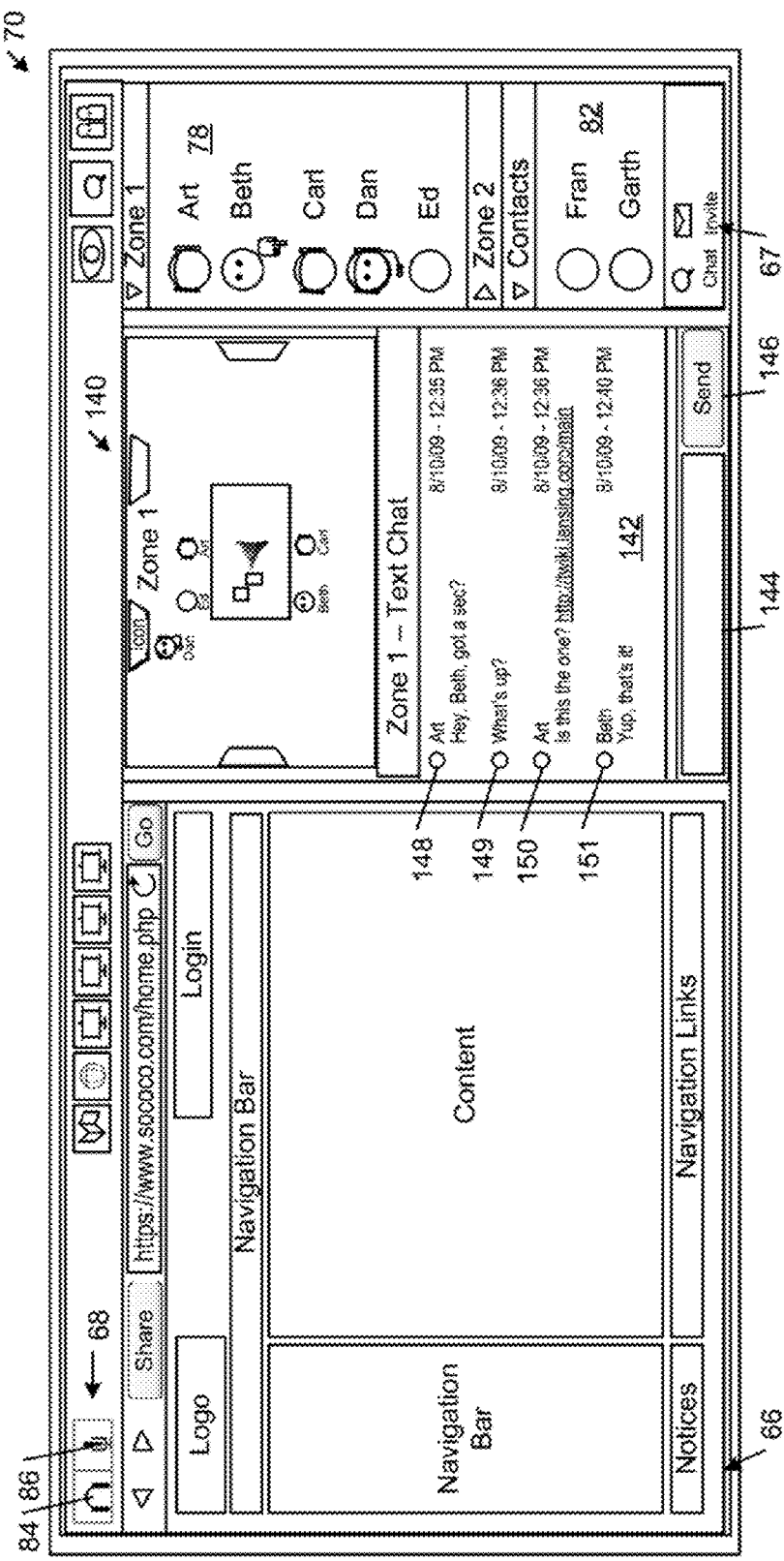

FIG. 11 shows an example of the graphical user interface 70 when the people panel 65, a chat panel 140, and the viewer panel 66 are open.

Activating the chat panel button 73 or the chat button 98 opens the chat panel 140. When the chat panel button 73 is activated, the chat panel 140 opens to show a chat interface for a persistent virtual chat area for interactions occurring in connection with a respective virtual area. In the example shown in FIG. 11, Art activated the chat panel button 73 at the time he was present in Zone 1; therefore, the chat panel 140 shown in FIG. 11 contains the persistent virtual chat area for text chat interactions occurring in connection with Zone 1. When the chat button 98 is activated, on the other hand, the chat panel 140 opens to show a chat interface for a persistent personal virtual area for interactions between Art and a selected one of the communicants. Examples of personal virtual areas are described in U.S. patent application Ser. No. 12/509,658, filed Jul. 27, 2009.

The chat interface of the chat panel 140 includes a chat log area 142, a text box 144, and a Send button 146. The chat panel 402 also includes a minimap view of the current zone (zone 1) in which the user is present. In this example, the user may enter text messages in the text box 144 and activate the Send button 146 to transmit the text messages to the other communicants who are present in the zone.

The user may enter text messages in the text box 144 and transmit the text messages to the other communicants who are in the same zone by selecting the Send button 146. The chat log area 142 displays a log of current and optionally prior events that are associated with the current zone. An exemplary set of events that may be displayed in the chat log area 142 include: text messages that the user has exchanged with other communicants in the current zone; changes in the presence status of communicants in the current zone; changes in the speaker and microphone settings of the communicants in the current zone; and the status of the object in the zone (discussed below), including references to any applications and data files that are shared in connection with the objects. In the illustrated embodiments, the events are labeled by the communicant's name followed by content associated with the event (e.g., a text message) or a description of the event.

The chat panel 140 provides a context for organizing the presentation of the events that are displayed in the chat log area 142. For example, in the illustrated embodiment, each of the displayed events is labeled with a respective tag that visually correlates with the appearance of the sprite of the communicant that sourced the displayed event. In particular, each of the events that is sourced by a particular one of the communicants is labeled with a respective icon 148, 149, 150, 151 having a visual appearance (e.g., color-code, or design pattern) that matches the visual appearance of that communicant's sprite. In this example, the color of the icons 148, 150 matches the color of the body of Art's sprite, and the color of the icon 149, 151 matches the color of the body of Beth's sprite.

In some examples, the platform enables a communicant to associate objects in the zones of a virtual area with network resources, and maintains those associations across sessions to provide zones with persistent network resource associations that can be accessed immediately upon entry into the zones.

In these examples, an object (e.g., a view screen object) in a zone of a virtual area has a configurable uniform resource identifier (URI) property that a communicant can configure to associate a network resource with the object and thereby create "spatial bookmarks" for the network resources at the respective object locations in the zones of the virtual area. In this way, a communicant can customize a zone of a persistent virtual area with any type of network accessible resources to suit any particular purpose and then share the network resources with other communicants in the zone. For example, communicants can associate view screen objects in a zone of a virtual area with respective cloud-based services that relate to a particular project or business function (e.g., finance, accounting, software development, project management). The platform stores persistent records of the state of each zone of the virtual area, including the service associations with objects and the communicant interactions (e.g., chat, recordings, shared documents) that occurred in the zone so that each time the communicants enter the zone they can continue where they left off with single-click access to the services that are relevant to the particular project or business function associated with the zone. Being able to place and keep services running in a zone of a virtual area means that meetings start with live application information (e.g., network resource information, stored documents, prior chat conversations, and recorded audio conversations) already in the zone, and can restart where communicants left a discussion at the end of the previous meeting. Additional details of examples of processes for associating objects in a zone with network resources are described in U.S. patent application Ser. No. 13/399,775, filed Feb. 17, 2012, and U.S. patent application Ser. No. 13/399,737, filed Feb. 17, 2012.

III. CONCLUSION

Other embodiments are within the scope of the claims.

The invention claimed is:

1. A method, comprising
by apparatus of a virtual area creation service that provides services enabling realtime synchronous conferencing communications between client network nodes:
receiving information for creating a virtual area, wherein the information comprises communicant information designating a set of users of the network service as members of the virtual area, and network service information comprising a property value for accessing a network service that administers data associated with the designated members of the virtual area;
after the receiving, creating the virtual area and associating the communicant information and the network service information with the virtual area;
responsive to requests from client network nodes of respective ones of the designated members,
establishing a respective presence in the virtual area for each of the respective designated members, and
sending a specification that enables the respective client network nodes to create a visualization of the virtual area; and
in a context of the visualization of the virtual area, providing realtime synchronous conferencing communications between the respective client network nodes and, based on the property value, providing the respective designated members with shared access to the data administered by the network service.

2. The method of claim 1, wherein the property value is a uniform resource identifier (URI) of the network service.

3. The method of claim 2, further comprising by the apparatus of the virtual area creation service:
for an object associated with the virtual area, maintaining an object record associated with the object and comprising one or more property fields storing respective values defining properties of the object including the URI of the network service; and
sending a specification of the property values to the respective client network nodes.

4. The method of claim 3, wherein the object record comprises at least one property field associating an iconographic representation of the network service with the object.

5. The method of claim 3, wherein the object is associated with screen sharing functionality of the virtual area based realtime communications client application.

6. The method of claim 1, wherein the users of the network service are associated with a service account of the network service.

7. The method of claim 6, further comprising by the apparatus of the virtual area creation service:
determining user information from the profile information; and
sending the user information to the client network node in connection with account creation functionality of the virtual area based realtime communications client application.

8. The method of claim 1, further comprising by the apparatus of the virtual area creation service:
from the received information extracting customization information for customizing installation of a virtual area based realtime communications client application on the client network nodes of respective ones of the designated members of the virtual area;
storing the extracted information in association with an identifier;
associating the identifier with an installation package for installing a virtual area based realtime communications client application on the client network nodes of the respective ones of the designated members of the virtual area; and
sending the extracted information to the client network nodes of the respective ones of the designated members based on receipt of the identifier from those client network nodes.

9. The method of claim 8, further comprising by the apparatus of the virtual area creation service sending the extracted information to one or more other client network nodes based on receipt of the identifier from the one or more other client network nodes.

10. The method of claim 8, wherein the providing comprising presenting a link for downloading the installation package on a web page that is cobranded with an identifier of a provider of the virtual area creation service and an identifier of the network service.

11. The method of claim 1, further comprising by the apparatus of the virtual area creation service maintaining a persistent association between the virtual area and the network service.

12. The method of claim 1, wherein the network service provides a web-based tool for the respective designated members to interact with the data administered by the network service in the context of the visualization of the virtual area.

13. Apparatus of a virtual area creation service that provides services enabling realtime synchronous conferencing communications between client network nodes, comprising:
a memory storing processor-readable instructions; and
a processor coupled to the memory, operable to execute the instructions, and based at least in part on the execution of the instructions operable to perform operations comprising
receiving information for creating a virtual area, wherein the information comprises communicant information designating a set of users of the network service as members of the virtual area, and network service information comprising a property value for accessing a network service that administers data associated with the designated members of the virtual area;
after the receiving, creating the virtual area and associating the communicant information and the network service information with the virtual area;
responsive to requests from client network nodes of respective ones of the designated members,
establishing a respective presence in the virtual area for each of the respective designated members, and
sending a specification that enables the respective client network nodes to create a visualization of the virtual area; and
in a context of the visualization of the virtual area, providing realtime synchronous conferencing communications between the respective client network nodes and, based on the property value, providing the respective designated members with shared access to the data administered by the network service.

14. At least one computer-readable medium having processor-readable program code embodied therein, the processor-readable program code adapted to be executed by a processor to implement a method comprising:
receiving information for creating a virtual area, wherein the information comprises communicant information designating a set of users of the network service as members of the virtual area, and network service information comprising a property value for accessing a network service that administers data associated with the designated members of the virtual area;
after the receiving information, creatin the virtual area and associating the communicant information and the network service information with the virtual area;
responsive to requests from client network nodes of respective ones of the designated members,
establishing a respective presence in the virtual area for each of the respective designated members, and
sending a specification that enables the respective client network nodes to create a visualization of the virtual area; and
in a context of the visualization of the virtual area, providing realtime synchronous conferencing communications between the respective client network nodes and, based on the property value, providing the respective designated members with shared access to the data administered by the network service.

15. A method, comprising by a computer system:
from a client network node, receiving a request to create a virtual area in connection with communicant information associated with one or more communicants who are to be designated as members of the virtual area;
creating the virtual area based on the received communicant information, wherein the creating comprises determining a virtual area template defining geometric and communication properties of the virtual area, generating a unique virtual area identifier for the virtual area, and associating the communicant information and the virtual area template with the unique virtual area identifier; and
providing a virtual area based realtime communications application that is installable on a client network node and is operable to generate a graphical user interface for displaying a visualization of the virtual area in accordance with the virtual area template and providing interaction controls enabling a user to specify where to establish a presence in the virtual area and interaction controls enabling a user to manage interactions with one or more other communicants in the virtual area.

16. The method of claim 15, wherein the communicant information comprises a respective communication service handle for each of one or more of the communicants who are to be designated as members of the virtual area.

17. The method of claim 15, further comprising:
providing to the client network node an interface for specifying the communicant information;
connecting to a directory service providing access to communicant information stored in a remote network directory;
based on user input received from the client network node, querying the directory service for communicant information in the remote network directory;
transmitting results of the querying to the client network node for presentation in the interface; and
based on user input in connection with the transmitted results of the querying, retrieving from the remote network directory the communicant information associated with the one or more communicants who are to be designated as members of the virtual area.

18. The method of claim 15, further comprising:
generating a virtual area reference to the virtual area;
transmitting the virtual area reference to a particular client network node; and
based on receipt of a request to follow the reference from the particular client network node, transmitting instructions for rendering an instance of the virtual area in accordance with the virtual area template to an instance of the virtual area based realtime communications application operating on the particular network node.

19. The method of claim 18 wherein the transmitting of the virtual area reference comprises transmitting the virtual area reference to the particular client network node in association with an invitation to enter the virtual area.

* * * * *